United States Patent [19]
Moriya et al.

[11] Patent Number: 5,875,356
[45] Date of Patent: Feb. 23, 1999

[54] LENS-FITTED PHOTO FILM UNIT

[75] Inventors: Mitsuhiro Moriya; Yuji Mikami, both of Kanagawa, Japan

[73] Assignee: Fuji Photo Film Co., Ltd., Kanagawa, Japan

[21] Appl. No.: 933,828

[22] Filed: Sep. 19, 1997

[30] Foreign Application Priority Data

Sep. 24, 1996 [JP] Japan .................................. 8-251438
Feb. 28, 1997 [JP] Japan .................................. 9-045500
Aug. 25, 1997 [JP] Japan .................................. 9-228525

[51] Int. Cl.$^6$ .................................................. G03B 17/24
[52] U.S. Cl. ............................................ 396/6; 396/396
[58] Field of Search ................................ 396/6, 395, 396, 396/411, 284, 515

[56] References Cited

U.S. PATENT DOCUMENTS 5,652,933  7/1997  Zander .................................. 396/396

FOREIGN PATENT DOCUMENTS 8-211565  8/1996  Japan .

Primary Examiner—David M. Gray
Attorney, Agent, or Firm—Young & Thompson

[57] ABSTRACT

A lens-fitted photo film unit is pre-loaded with a photo film of a predetermined length. The photo film is retained on a spool. A winder wheel is connected to the spool. After each frame is exposed on the photo film, the winder wheel is manually rotated to wind the photo film into a cassette shell about the spool. In the lens-fitted photo film unit, a combination of a detector cutout and a protruded portion detects that the winder wheel has made a predetermined number of rotations, which depends upon the predetermined length of the photo film. A combination of a recess and a protruded portion locks rotation of the winder wheel in response to rotation of the winder wheel to a predetermined rotational position after the predetermined number of the rotations of the winder wheel. The winder wheel is inhibited from being rotated after the photo film is entirely wound into the cassette shell.

22 Claims, 31 Drawing Sheets

LENS-FITTED PHOTO FILM UNIT

BACKGROUND OF THE INVENTION

1. Field of the Invention

The present invention relates to a lens-fitted photo film unit. More particularly, the present invention relates to a lens-fitted photo film unit pre-loaded with a photo film cassette, and of which the photo film cassette being removed after exposures can be safely handled.

2. Description Related to the Prior Art

There is a lens-fitted photo film unit pre-loaded with a photo film, and provided with a simple construction for taking exposures. The photo film is contained in the lens-fitted photo film unit in a state where a trailing end of the photo film is secured to a spool. The spool is contained in a cassette in a rotatable manner. A winder wheel is connected to the spool, and after each exposure, is rotated to wind an exposed portion of the photo film into the cassette. The cassette can be unloaded from the lens-fitted photo film unit in an illuminated room, not in a dark room. There is a type of the lens-fitted photo film unit in which a cassette shell is formed from resin, contains the photo film, and in which an operation of inserting the photo film into the lens-fitted photo film unit is facilitated.

There is a photo film passageway or mouth, defined along a line between the shell halves, for passage of the photo film between the inside and the outside of the cassette shell. A cassette shutter is contained in an inner position of the passageway, and rotates to open/close the passageway. There are indicator openings formed in one of end faces of the cassette shell where an indicator plate is disposed. The indicator openings are different in the shape, and associated with respective meanings of "Unexposed", "Partially exposed", "Exposed" and "Developed" statuses of the photo film. The indicator plate with the spool rotates in its position behind the indicator openings inside the cassette shell, and is stopped in any one of the indicator openings. One meaning associated with one of the indicator openings through the indicator plate is visible implies the status that the photo film has in the cassette shell.

After taking exposures in all of the available frames, a user forwards the lens-fitted photo film unit to a photo laboratory and requests photo finishing of the photo film. A photofinishing operator of the photo laboratory removes the cassette from the lens-fitted photo film unit. Before the cassette is removed from the lens-fitted photo film unit, the winder wheel is checked by applying rotary force to it by the operator. This is because it should be confirmed that the entirety of the photo film has been wound into the cassette shell. Since this cannot be confirmed by observing the appearance of the lens-fitted photo film unit, rotary force is manually applied to the winder wheel for the confirmation. There is, however, a problem in that such a manual operation is very slow and inconsistent with high efficiency in the photofinishing operation.

In a camera for use with the cassette, there is a photo sensor for detecting a rotational position of the spool. To remove the cassette from the camera, the indicator plate is controlled to stop behind the indicator opening indicating the "Exposed" status. This is for the purpose of avoiding erroneously reloading a camera with the cassette being used. However the lens-fitted photo film unit does not have such a construction for reasons of cost, a space for incorporation and the like. The indicator plate of the cassette removed from the lens-fitted photo film unit is not in a predetermined position. If a user unloads the cassette being used from the lens-fitted photo film unit, the indicator plate is likely to stop behind the indicator opening indicating the "Unexposed" status. The user is likely to incorrectly load a camera with the cassette being used.

SUMMARY OF THE INVENTION

In view of the foregoing problems, an object of the present invention is to provide a lens-fitted photo film unit in which the finish of entirely winding a photo film into a cassette shell can be confirmed with ease, and in which a photo film cassette can be unloaded after an indicator is set to indicate the "Exposed" status of the photo film.

Another object of the present invention is to provide a lens-fitted photo film unit in which a cassette shutter in a cassette shell is closed by a final rotational operation of a winder wheel of a lens-fitted photo film unit.

Still another object of the present invention is to provide a lens-fitted photo film unit in which a shutter rotating member is prevented from inseparably sticking on a timing lever.

In order to achieve the above and other objects and advantages of this invention, a photo film of a predetermined length is retained on a spool. A winder wheel is connected to the spool at a predetermined angular position according to a rotational direction. Each time after one frame is exposed on the photo film. The winder wheel is externally rotated to wind the photo film after exposure into a cassette shell about the spool. A lens-fitted photo film unit includes a position detector for detecting that the winder wheel has made a predetermined number of rotations, the predetermined number depending upon the predetermined length of the photo film. A lock mechanism locks rotation of the winder wheel in response to rotation of the winder wheel to a predetermined rotational position after the predetermined number of the rotations of the winder wheel, the lock mechanism inhibiting the winder wheel from being rotated after the photo film is entirely wound into the cassette shell.

The cassette shell includes an indicator plate disposed in a manner rotatable integrally with the spool. At least two indicator openings are formed to open in a wall covering the indicator plate, arranged in the rotational direction of the indicator plate, for respectively causing the indicator plate to appear externally, respectively to indicate an unexposed status and an exposed status of the photo film, wherein the indicator indicates the exposed status when the spool is stopped in the predetermined rotational position.

In a preferred embodiment, an intermittent gear is disposed in a manner rotatable integrally with the winder wheel, and has at least one tooth. A counter gear is meshed with the intermittent gear, and stepped by a regular angle by rotation of the intermittent gear, the counter gear being adapted to counting the frame created on the photo film. The position detector includes a cam disk disposed in a manner rotatable integrally with the counter gear. A detector protruded portion is disposed near to the winder wheel in a swingable manner, and confronted with a peripheral face of the cam disk. A bias member pushes the detector protruded portion on the peripheral face of the cam disk. A detector cutout is formed in the peripheral face of the cam disk, confronted with the detector protruded portion upon a finish of the predetermined number of the rotations of the winder wheel, the detector protruded portion being swung by the bias member and engaged with the detector cutout, for signaling the finish of the rotations.

The lock mechanism includes a ring-shaped contact face disposed in a manner rotatable integrally with the winder wheel. A first retainer portion is disposed on the ring-shaped contact face. A second retainer portion is disposed to confront with the ring-shaped contact face, and engageable with the first retainer portion. A bias member pushes the second retainer portion to the ring-shaped contact face, the first retainer portion being confronted with the second retainer portion when the winder wheel is rotated to the predetermined rotational position, the bias member swinging the second retainer portion to engage the second retainer portion with the first retainer portion.

Consequently the finish of entirely winding the photo film into the cassette shell can be confirmed with ease. The photo film cassette can be unloaded after the indicator is set to indicate the "Exposed" status of the photo film.

In another preferred embodiment, a shutter rotating member is connected to an end of a cassette shutter, for rotating the cassette shutter. A transmission mechanism is actuated when the winder wheel has made a predetermined number of rotations, for rotating the shutter rotating member to the closed position of the cassette shutter in response to the rotations of the cassette shutter, the predetermined number depending upon the predetermined length of the photo film, the transmission mechanism closing the cassette shutter when the photo film is entirely wound into the cassette shell. A wheel lock mechanism locks the winder wheel in a predetermined position in response to rotation of the cassette shutter to the closed position, the wheel lock mechanism inhibiting the winder wheel from being rotated in response to rotation of the spool to a predetermined rotational position after the cassette shutter is closed by use of the transmission mechanism.

Consequently the cassette shutter in the cassette shell can be closed by a final rotational operation of the winder wheel.

In still another preferred embodiment, a shutter rotating member is connected to an end of a cassette shutter, for rotating the cassette shutter. A spring biases the shutter rotating member toward the closed position of the cassette shutter. A timing lever is disposed in a swingable manner between first and second positions, and when in the first position, being engaged with the shutter rotating member against the spring for retaining the shutter rotating member in the open position of the cassette shutter, and when in the second position, releasing the shutter rotating member from retention in the open position of the cassette shutter. An intermittent transmission unit is actuated when the winder wheel has made a predetermined number of rotations, for swinging the timing lever to the second position, the predetermined number being adapted to allow winding of the photo film entirely into the cassette shell. A pre-shifter member is disposed in the intermittent transmission unit, for swinging the timing lever in reverse to a direction toward the second position before swinging the timing lever toward the second position, to destroy fixedness between contacting points of the timing lever and the shutter rotating member with the shutter rotating member retained in the open position of the cassette shutter.

Alternatively instead of using the pre-shifter member, the timing lever may be formed of material different from material of which the shutter rotating member is formed, so as to prevent between contacting points of the timing lever and the shutter rotating member from being fixed on one another.

Consequently the shutter rotating member is prevented from inseparably sticking on the timing lever.

BRIEF DESCRIPTION OF THE DRAWINGS

The above objects and advantages of the present invention will become more apparent from the following detailed description when read in connection with the accompanying drawings, in which:

FIG. 21a is a plan, partially in section, illustrating a state before the transmission mechanism and the wheel lock mechanism are operated;

FIG. 21b is an enlarged fragment of FIG. 21a;

FIG. 24a is a plan, partially in section, illustrating a state where a connecting projection is received in a cutout in relation to the transmission mechanism;

FIG. 24b is an enlarged fragment of FIG. 24a;

FIG. 26a is a plan, partially in section, illustrating a state where an intermediate gear is slid in relation to the transmission mechanism;

FIG. 26b is an enlarged fragment of FIG. 26a;

DETAILED DESCRIPTION OF THE PREFERRED EMBODIMENTS OF THE PRESENT INVENTION

Figure 1:
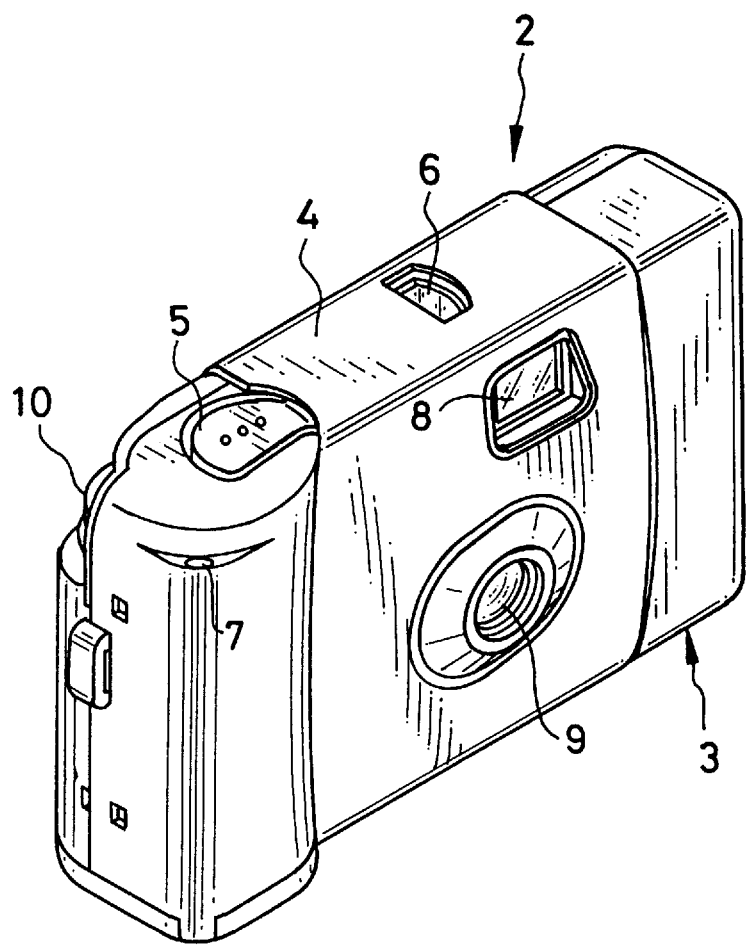
FIG. 1 is a perspective illustrating a lens-fitted photo film unit.

A lens-fitted photo film unit 2 is described with reference to FIG. 1. The lens-fitted photo film unit 2 is constituted by a housing 3 and an outer sheet member 4 or label for covering a part of the housing 3. The housing 3 pre-contains a photo film cassette, and incorporates a structure for taking exposures.

On the top of the housing 3 are disposed a shutter release button 5, a counter window 6 and a finish indicator window 7. The counter window 6 indicates the number of the remaining ones of the available frames. The finish indicator window 7 indicates a state of having finished winding the entirety of photo film. On the front of the housing 3 are disposed a viewfinder 8 and a taking lens 9. A winder wheel 10 partially protrudes to the rear, and is adapted to be rotated each time after one exposure is taken. The outer sheet 4 is attached to the housing 3 to wind its center, and includes openings through which the taking lens 9, the viewfinder 8, the counter window 6 and the like are uncovered externally.

Figure 2:
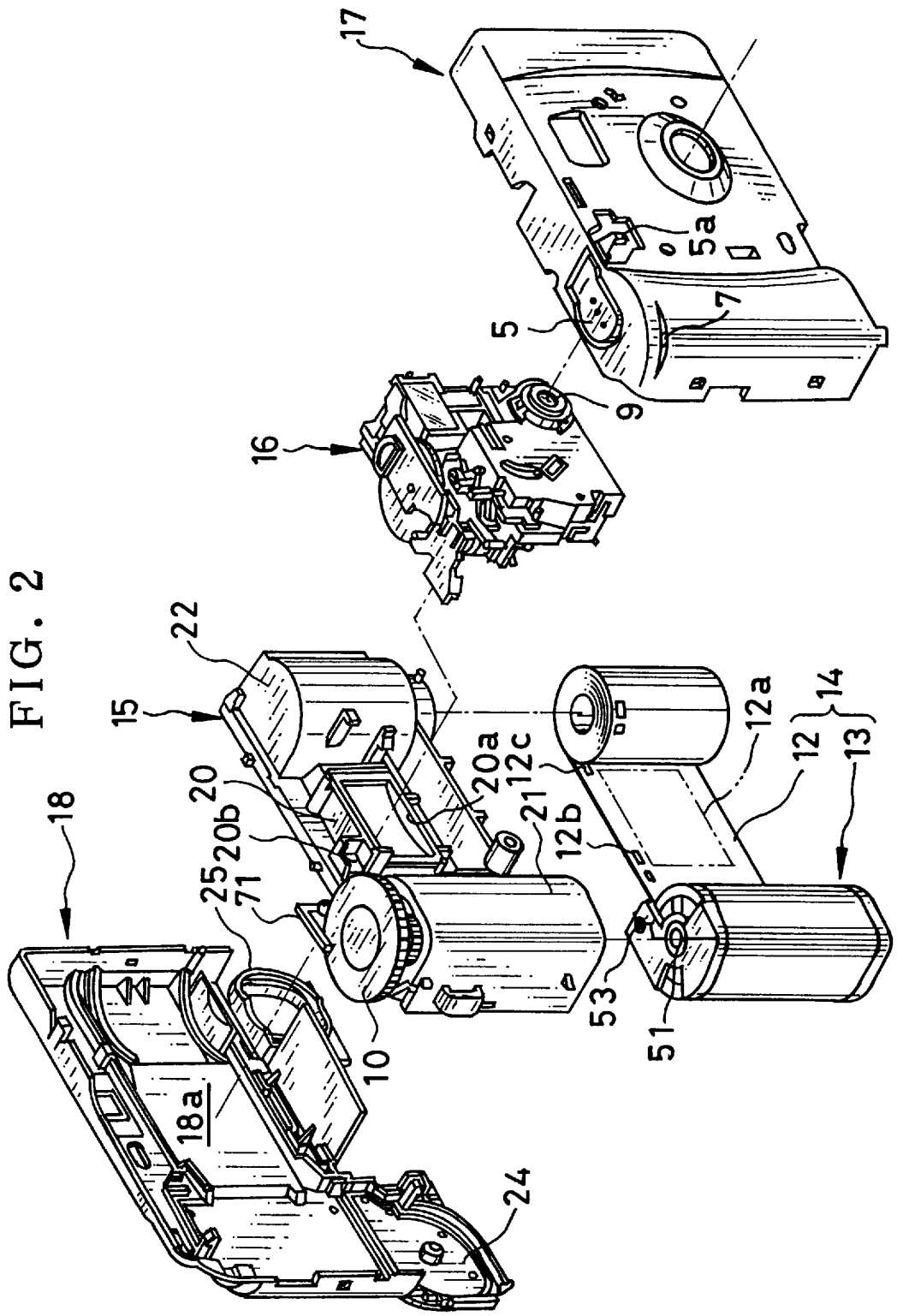
FIG. 2 is an exploded perspective illustrating a housing of the lens-fitted photo film unit.

In FIG. 2, the housing 3 is constituted by a photo film containing unit 15, an exposure unit 16 mounted in front of the photo film containing unit 15, a front cover 17 covering a front of the photo film containing unit 15, and a rear cover 18 covering a rear of the photo film containing unit 15. The front cover 17 and the rear cover 18 are fixedly mounted by use of engagement of hooks. The photo film containing unit 15 is pre-loaded with a photo film cassette 14, which consists of a cassette shell 13 to contain a photo film 12.

In the center of the photo film containing unit 15 is disposed a light-shielding tunnel 20, which shields ambient light from a photographic light path defined through the exposure unit 16 and toward the photo film 12. An exposure opening 20a is formed in the front of the light-shielding tunnel 20. An exposure aperture is formed in the rear of the light-shielding tunnel 20 for limiting an exposing range of the photo film 12. There is a photo film support face 18a formed on the rear cover 18 and confronted with the exposure aperture. The photo film containing unit 15 has a cassette containing chamber 21 and a photo film roll chamber 22 between which the light-shielding tunnel 20 is located. The cassette containing chamber 21 receives insertion of the cassette shell 13, and the roll chamber 22 receives insertion of a roll of the photo film 12, both in the course of manufacture of the lens-fitted photo film unit 2. The chambers 21 and 22 are formed integrally with the light-shielding tunnel 20.

A bottom lid 24 is located under the cassette containing chamber 21 and formed with the rear cover 18. A bottom lid 25 is located under the roll chamber 22 and formed with the rear cover 18. When the rear cover 18 is fitted behind the photo film containing unit 15, the bottom lids 24 and 25 are closed to shield the inside of the cassette containing chamber 21 and the roll chamber 22 from ambient light. The bottom lids 24 and 25 are flexible relative to the rear cover 18 via connection of thinner hinge portions. The bottom lid 24 is opened before the photo film cassette 14 is removed from the lens-fitted photo film unit 2.

The front cover 17 is mounted in front of the photo film containing unit 15 to cover the front, the top and the sides of the photo film containing unit 15. The shutter button 5 and the finish indicator window 7 are formed with the front cover 17. The photo film 12 has a train of perforations 12b and 12c. The perforation 12b is larger than the perforation 12c. Each of the perforations 12b is associated with a starting edge of one frame 12a. Each of the perforation 12c is associated with an ending edge of the one frame 12a.

Figure 3:
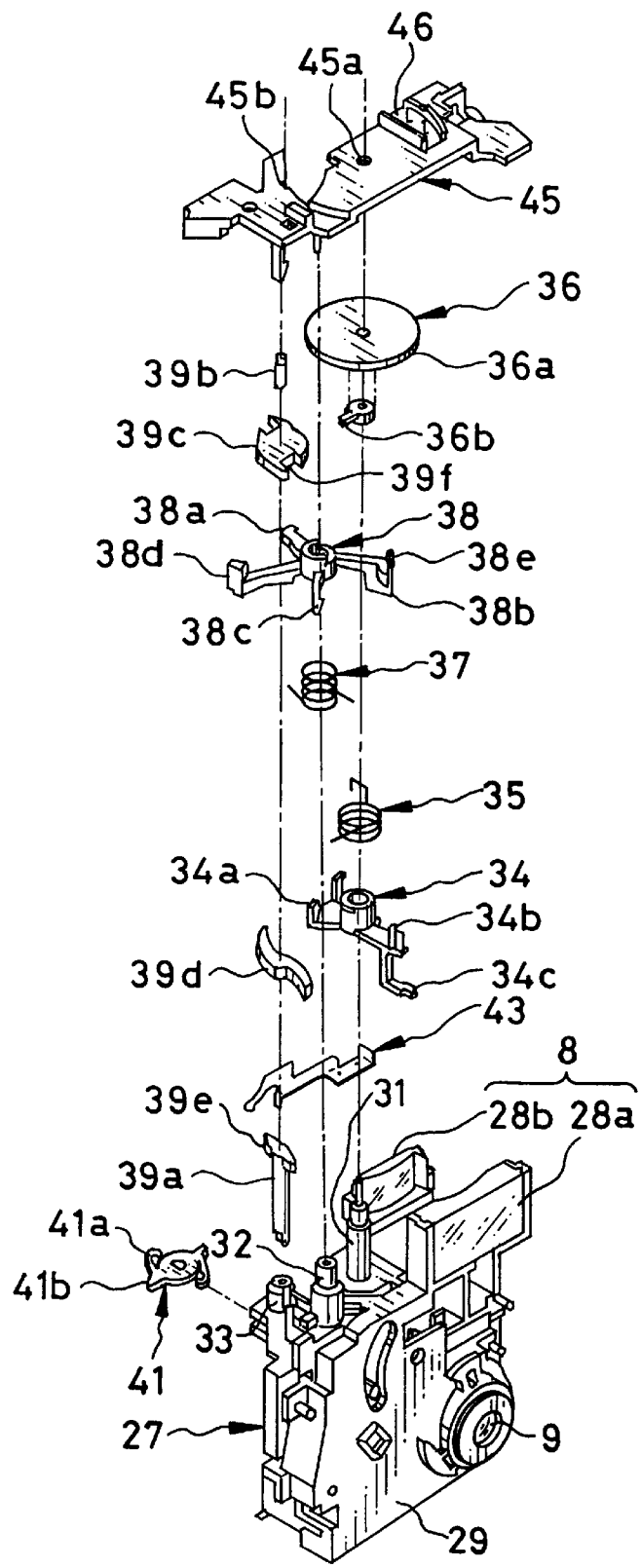
FIG. 3 is an exploded perspective illustrating an exposure unit of the lens-fitted photo film unit.

In FIG. 3, the exposure unit 16 consists of a unified combination of a base member 27 and relevant parts assembled on the base member 27. The base member 27 is mounted on the front of the light-shielding tunnel 20 in a removable manner. A top of the base member 27 supports a number of parts constituting a shutter mechanism, and also supports an objective lens 28a and an eyepiece lens 28b combined to constitute the viewfinder 8. A lens cover 29 is fitted on the front of the base member 27 to hold the taking lens 9. A shutter blade is disposed between the lens cover 29 and the base member 27 in a swingable manner.

On the top of the base member 27 are formed shafts 31 and 32 and shaft receiver 33. The shaft 31 receives a shutter drive lever 34, a release spring 35 and a counter plate 36 in an inserted manner in the order listed. The shaft 32 receives a lock spring 37 and a retainer lever 38 in an inserted manner in the order listed. The shaft receiver 33 receives a cam member 39 in an inserted manner.

A hole is formed in the shaft receiver 33 to come through to its bottom. A shaft portion 39a of the cam member 39 is inserted in the hole, and protrudes down through the bottom of the shaft receiver 33. A sprocket wheel 41 is engaged with the shaft portion 39a, and also appears backwards through an opening 20b in an upper portion of the light-shielding tunnel 20. The rear portion of the sprocket wheel 41 is confronted with the photo film 12. Two pairs of teeth 41a and 41b are formed on the periphery of the sprocket wheel 41 in a rotationally symmetrical manner. The teeth 41a are greater than the teeth 41b. The teeth 41a and 41b are meshed with the perforations 12b and 12c in the photo film 12, so that half a rotation of the sprocket wheel 41 is made by movement of the photo film 12 by one frame toward the inside of the cassette shell 13.

The cam member 39 is constituted by a two-toothed gear 39b, a wind block cam 39c, a charge cam 39d, a bias cam 39e and the shaft portion 39a, which are arranged downwards in the order listed and formed as one piece. The two-toothed gear 39b is in mesh with teeth 36a about the counter plate 36. A top of the counter plate 36 has a scale for indicating the numbers of the remaining available frames. The two-toothed gear 39b, when it makes half a rotation, causes the counter plate 36 to rotate by one step.

The wind block cam 39c has a pair of notches 39f formed in a rotationally symmetrical manner. Each time that the wind block cam 39c makes half a rotation, a block claw 38a is engaged with the notches 39f upon movement of the photo film 12 by one frame. The charge cam 39d consists of a pair of blade-shaped projections formed in a rotationally symmetrical manner, and when rotated, pushes a part of the shutter drive lever 34 to rotate the shutter drive lever 34 in a direction of charging of the shutter device.

The bias cam 39e is constituted by a pair of projections formed in a rotationally symmetrical manner, and is pushed by a plate spring 43 secured to the top of the base member 27. In the photo film 12, the perforations 12b and 12c are regularly intermittent but not consecutive. There occurs an unmeshed section where neither of the teeth 41a and 41b of the sprocket wheel 41 is meshed with the perforations 12b and 12c of the photo film 12. In the unmeshed section the plate spring 43 pushes the bias cam 39e to rotate the cam member 39 in the same rotational direction. Therefore the tooth 41b of the sprocket wheel 41 is moved to a standby position engageable with a succeeding one of the perforations 12c. Note that the plate spring 43 consists of a metal thin plate being flexed.

The shutter drive lever 34 is rotatable between a charged position located in the clockwise direction and a released position located in the counterclockwise direction. The shutter drive lever 34 is biased by the release spring 35 toward the released position. The shutter drive lever 34 includes a push receiving portion 34a, a rise portion 34b and a knocker arm 34c. The push receiving portion 34a is pushed by the charge cam 39d to rotate toward the charged position. The rise portion 34b, when in the charged position, is retained by the retainer lever 38. The knocker arm 34c knocks the shutter blade to swing it when rotated from the charged position to the released position.

The retainer lever 38 is engaged with the shutter drive lever 34 being in the charged position, and retains the shutter drive lever 34. The retainer lever 38 is rotatable between a blocking position and a non-blocking position located in the counterclockwise direction therefrom. In the blocking position, the retainer lever 38 blocks rotation of the winder wheel 10 and the cam member 39. In the non-blocking position, the retainer lever 38 releases retention of the shutter drive lever 34 in the charged position, and releases the winder wheel 10 and the cam member 39 from being blocked. The retainer lever 38 is biased toward the blocking position by the lock spring 37.

The retainer lever 38 includes a drop portion 38b, a drop rod 38c, a lock claw 38d and the wind block claw 38a. The drop portion 38b is engaged with the rise portion 34b of the shutter drive lever 34. The drop rod 38c is pushed by a push rod 5a formed with the shutter button 5, and moved toward a non-blocking position where blockage to winding is released. The lock claw 38d is meshed with teeth 10a about the winder wheel 10 of FIG. 6 and blocks rotation of the winder wheel 10.

The retainer lever 38 also has a rise projection 38e. After all the available frames of the photo film 12 are exposed, the perforations 12b and 12c of the photo film 12 are disengaged from the teeth 41a and 41b of the sprocket wheel 41. After this, the rise projection 38e is contacted by a cam 36b under the counter plate 36. Upon this contact, the counter plate 36 is hindered from rotating further. The two-toothed gear 39b of the cam member 39 does not rotate either. There does not occur any more operations of charging the shutter. The retainer lever 38 does not rotate to the blocking position. The winder wheel 10 becomes rotationally free.

A top plate 45 is mounted on the top of the base member 27. A hole 45a in the top plate 45 supports a top of the shaft 31. A cutout 45b in the top plate 45 supports a top of the cam member 39. The top plate 45 is wholly transparent and formed from resin. A reference numeral 46 designates a lens for enlarging a numeral in a scale formed on the counter plate 36.

Figure 4:
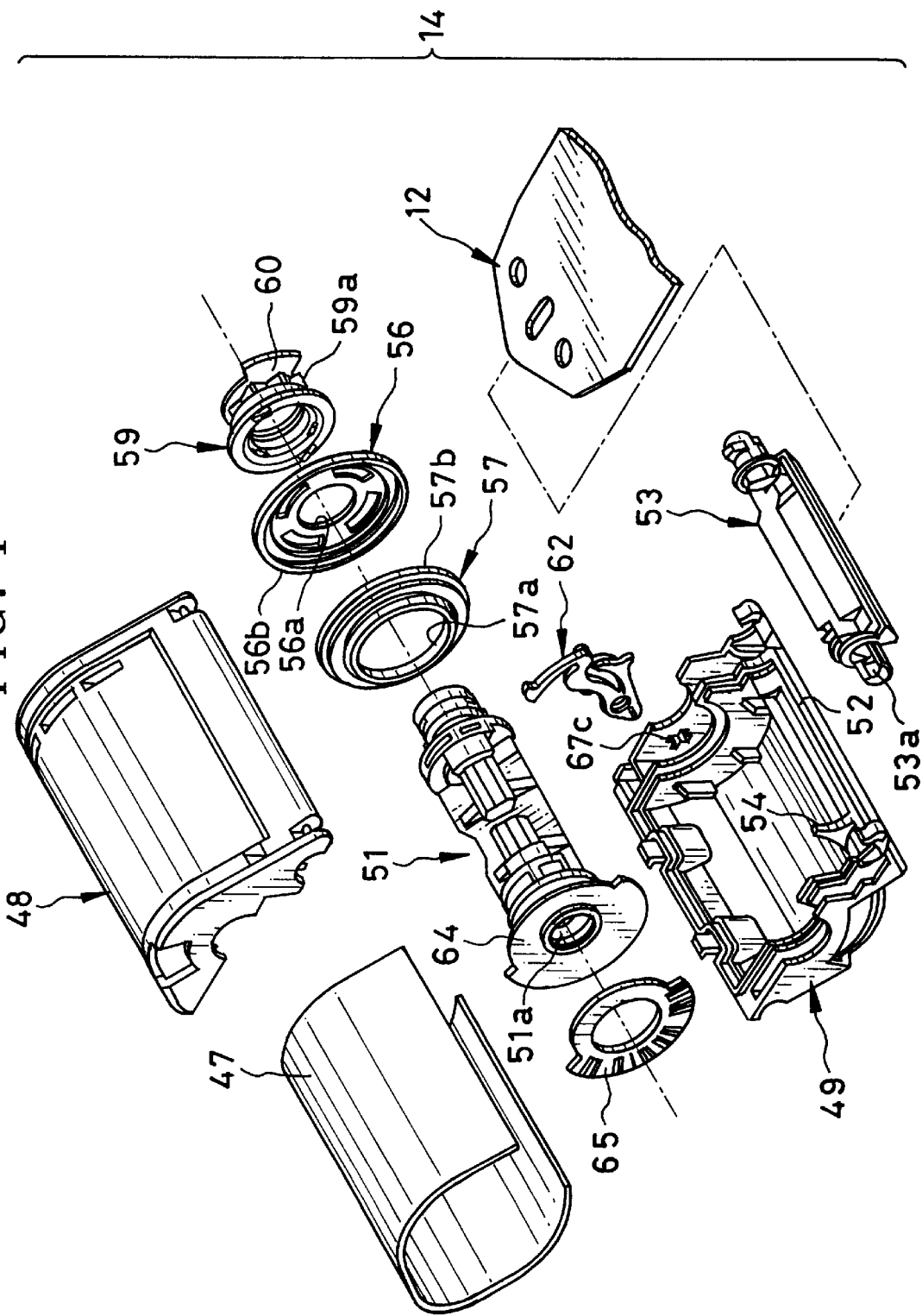
FIG. 4 is an exploded perspective illustrating a photo film cassette for the lens-fitted photo film unit.

In FIG. 4, the photo film cassette 14 is constituted by the cassette shell 13 and the photo film 12 contained in the cassette shell 13. There is a sticker 47 attached about the cassette shell 13. The cassette shell 13 is constituted by shell halves 48 and 49 being formed from resin, and includes various parts assembled therein.

A spool 51 is contained in the cassette shell 13 in a rotatable manner. A trailer of the photo film 12 is retained on the spool 51. Each of distal ends of the spool 51 has an engaging hole 51a, with which a drive shaft or the winder heel 10 is engageable. The engaging hole 51a appears through either end face of the shell halves 48 and 49. A key way 51b is formed in the engaging hole 51a. See FIG. 5.

There is a photo film passageway 52, defined along a line between the shell halves 48 and 49, for passage of the photo film 12 between the inside and the outside of the cassette shell 13. A cassette shutter 53 is contained in an inner position of the passageway 52, and rotates to open/close the passageway 52. Axial ends of the cassette shutter 53 have an engaging portion 53a engageable with an external drive shaft for being rotated. The engaging portion 53a appears through each of the shell halves 48 and 49 in a manner like the spool 51.

A projection 54 is formed on the shell half 49 in an inside position of the passageway 52. The projection 54 separates a leader of the photo film 12 about the spool 51, and guides the leader to the passageway 52.

The spool 51 receives insertion of holes 56a and 57a of disks 56 and 57, which are supported in a rotatable manner. Circumferential lips 56b and 57b protrude respectively from the disks 56 and 57 and toward each other, and partially cover the outermost turn of a roll of the photo film 12 wound about the spool 51, to prevent the photo film 12 from being unwound. When the spool 51 is rotated in the unwinding direction being clockwise, the photo film 12 rotates with the spool 51. The leader of the photo film 12 during the rotation is directed by the projection 54 to move toward the passageway 52, and then advance to the outside.

A latch member 59 is fixedly mounted on a position outside from the disk 56. The latch member 59 includes an indicator plate 60 and a latch gear 59a formed integrally therewith, and is rotatable with the spool 51. A reference numeral 62 designates a latch lever for latching the spool 51. When the cassette shutter 53 is rotationally shifted to a closed position, the latch lever 62 is pushed by a cam formed with the cassette shutter 53, and becomes engaged with the latch gear 59a of the latch member 59 to latch rotation of the spool 51. When the cassette shutter 53 is shifted to an open position, the spool 51 is released from latching of the latch lever 62.

A data plate 64 is formed integrally with the other axial end of the spool 51, and has a shape with a sectorial recess.

A data sticker 65 is attached to the data plate 64, and has a rotary bar code of which bars are radially directed. The bar code of the data sticker 65 represents sensitivity and the number of the available frames of the photo film 12, and is read by a reader inside a camera or other optical instruments when the cassette is loaded therein.

Figure 5:
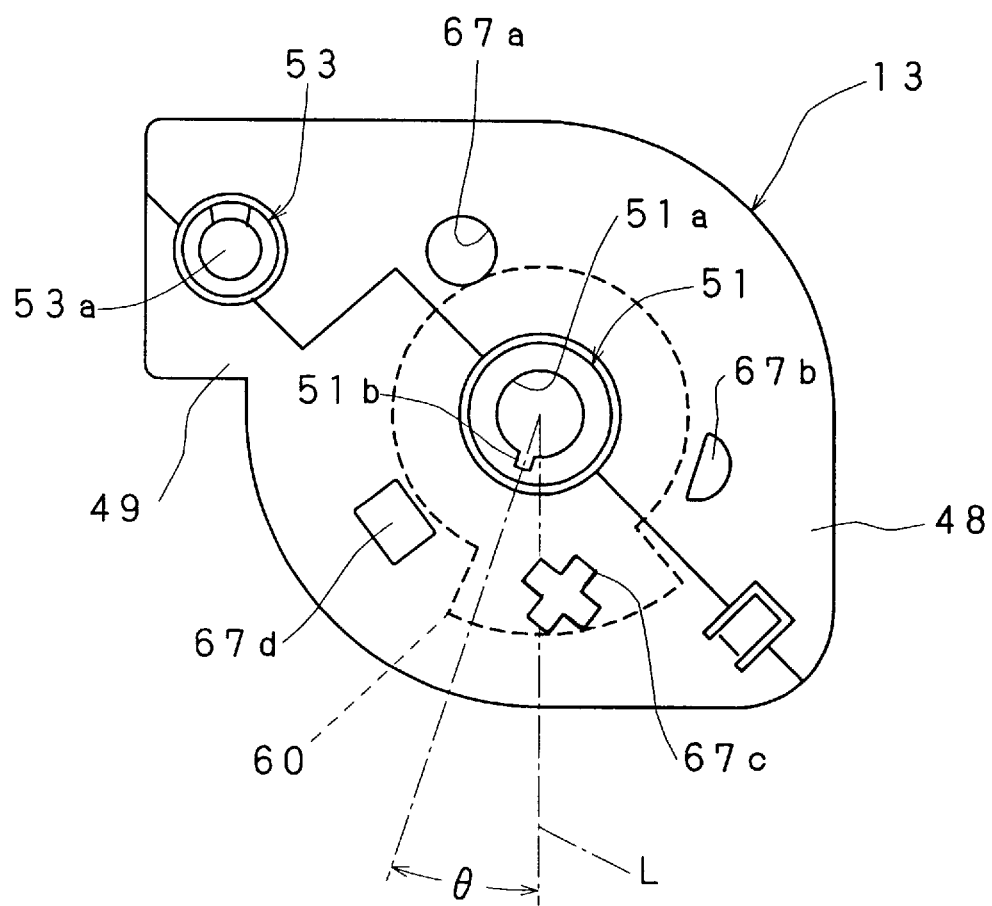
FIG. 5 is a side elevation illustrating the photo film cassette.

In FIG. 5, there are indicator openings 67a, 67b, 67c and 67d formed in one of end faces of the cassette shell 13 where the indicator plate 60 is disposed. The indicator openings 67a–67d are different in the shape, and associated with respective meanings of "Unexposed", "Partially exposed", "Exposed" and "Developed" statuses of the photo film. The indicator plate 60 with the spool 51 rotates in its position behind the indicator openings 67a–67d inside the cassette shell 13, and is stopped in any one of the indicator openings 67a–67d. One meaning associated with one of the indicator openings 67a–67d through the indicator plate 60 is visible implies the status that the photo film 12 has in the cassette shell 13. Note that the key way 51b of the engaging hole 51a is directed at an angle θ relative to a reference line L of the cassette shell 13 when the indicator plate 60 is properly positioned behind the indicator opening 67c.

Figure 6:
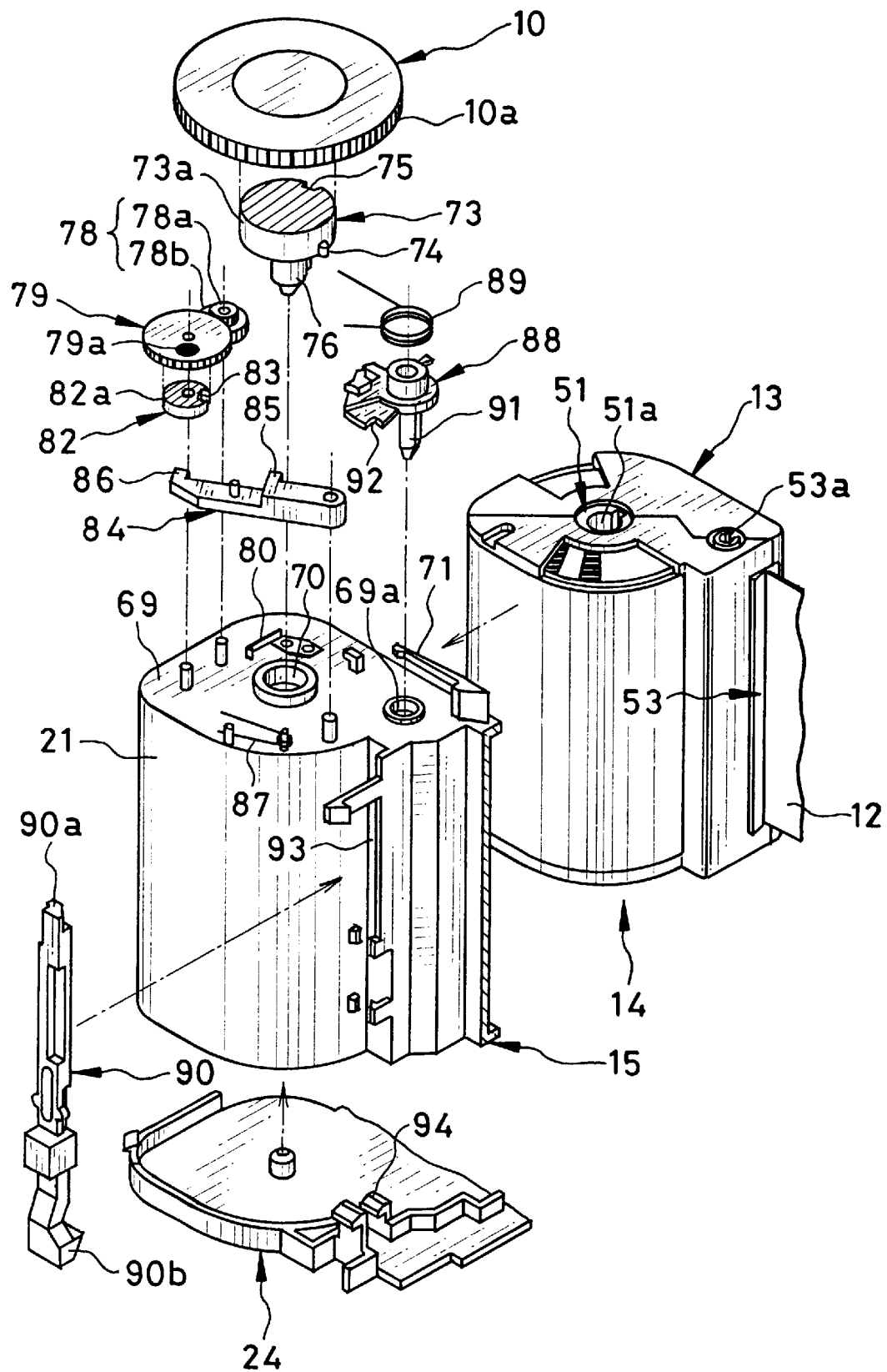
FIG. 6 is an exploded perspective illustrating a position detector and a lock mechanism.
Figure 7:
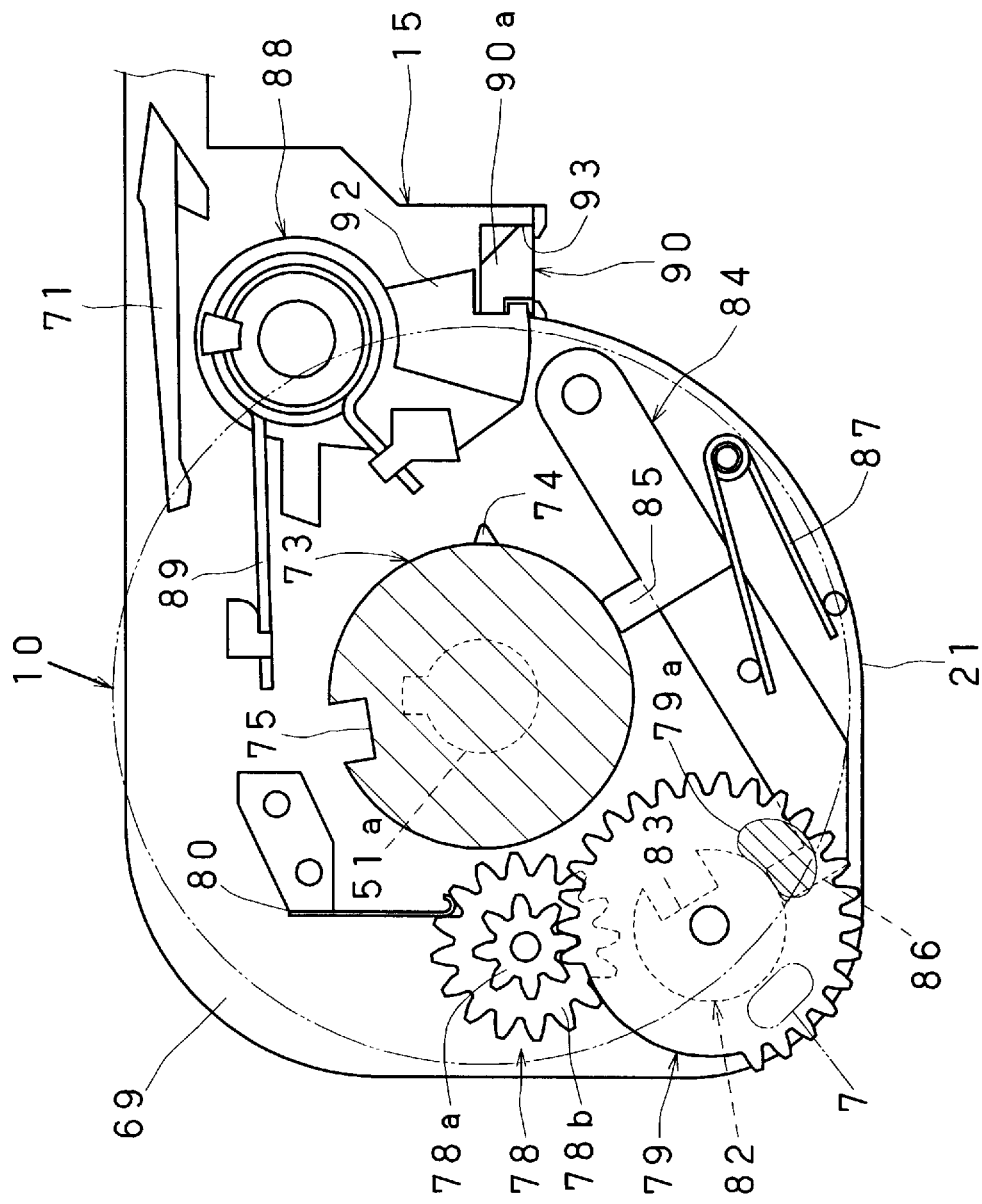
FIG. 7 is a top plan illustrating a state before the position detector and the lock mechanism are operated.

In FIGS. 6 and 7, a center of a top face 69 of the cassette containing chamber 21 has a shaft receiver 70, which supports the winder wheel 10 in a rotatable manner. The teeth 10a about the winder wheel 10 is adapted to facilitation of manual rotation of the winder wheel 10 with friction. A one-direction claw 71 is in mesh with the teeth 10a as well as the wind block claw 38a of the retainer lever 38. The one-direction claw 71 prevents the winder wheel 10 from rotating in a clockwise direction reverse to the winding direction. The one-direction claw 71 is formed with the top face 69 of the cassette containing chamber 21.

There is a one-toothed gear 73 as intermittent gear formed integrally with a bottom of the winder wheel 10. The one-toothed gear 73 is operated both for a position detector and for a lock mechanism. The position detector detects completion of rotation of the winder wheel 10 sufficient for winding the entirety of the photo film 12 into the cassette shell 13. The lock mechanism blocks rotation of the winder wheel 10 when one rotational position of the winder wheel 10 is detected after detection of the position detector. The one-toothed gear 73 has a ring-shaped contact face 73a or peripheral face formed cylindrically. On the ring-shaped contact face 73a are formed one tooth 74 and a recessed retainer portion 75 or lock cutout included in the lock mechanism. An engaging shaft 76 is formed integrally with a bottom of the one-toothed gear 73 in a manner engageable with the engaging hole 51a of the spool 51. Note that the one rotational position is predetermined in association with a position of the spool 51 of which the indicator plate 60 is positioned behind the indicator opening 67c indicating the "Exposed" status.

A great number of pins are disposed on the top face 69 of the cassette containing chamber 21, including one for supporting a speed reduction gear 78 in a rotatable manner, and another for supporting a counter gear 79 in a rotatable manner. The speed reduction gear 78 and the counter gear 79 cooperate with the position detector. The speed reduction gear 78 is constituted by a top gear 78a of a relatively small diameter and a bottom gear 78b of a greater diameter. The bottom gear 78b is meshed with the one tooth 74 of the one-toothed gear 73 in an intermittent manner, and rotated by a regular angle of one tooth. The top gear 78a is meshed with the counter gear 79, which is adapted to counting the number of rotations made by the winder wheel 10. The periphery of the counter gear 79 has an arc-shaped section without tooth, which comes confronted with the speed reduction gear 78 upon the finish of the counting operation, and prevents the counter gear 79 from rotating after the entirety of the photo film 12 is wound.

An indicia 79a is printed on one position in a top of the counter gear 79, and has a color different from the front cover 17. When the winder wheel 10 has finished making a predetermined number of rotations to wind the entirety of the photo film 12 into the cassette shell 13, the indicia 79a is moved to a position under the finish indicator window 7 in the front cover 17 and becomes observable externally. A reference numeral 80 designates a plate spring mounted on the top of the cassette containing chamber 21, meshed with the bottom gear 78b, for preventing the speed reduction gear 78 and the counter gear 79 from erroneously rotating even with external shock or vibration.

Of course rotations of the winder wheel 10 may be counted directly by the counter gear 79. However there occurs a problem in that the spool 51 must make approximately 45 rotations for winding the photo film 12 if the photo film 12 has a length for 40 exposures as a great-length photo film. The counter gear 79 makes over one rotation before finishing counting 45 rotations. It would be conceivable to change a size of the counter gear 79 for the purpose of reducing the rotation of the counter gear 79 to less than one rotation before finishing the counting operation. Another problem, however, arises in that a diameter of a pitch circle must be 12–15 mm assuming that the counter gear 79 has teeth of an involute gear. The counter gear 79 with this size cannot be contained in a space at the top face 69 of the cassette containing chamber 21. In view of those problems, the speed reduction gear 78 in the present embodiment is used between the one-toothed gear 73 and the counter gear 79.

A cam disk 82 is formed integrally with a bottom of the counter gear 79. The cam disk 82 has a peripheral face 82a in which there is formed a detector cutout 83 included in the position detector. A timing lever 84 is supported on a pin on the top face 69 in a swingable manner. The timing lever 84 has a protruded retainer portion 85 and a detector protruded portion 86. The protruded retainer portion 85 or lock projection is included in the lock mechanism, and confronted with the ring-shaped contact face 73a of the one-toothed gear 73. The detector protruded portion 86 is included in the position detector, and confronted with the pheripheral face 82a of the cam disk 82. The timing lever 84 is biased by a torsion coil spring 87 in the clockwise direction, to keep the detector protruded portion 86 in contact with the pheripheral face 82a of the cam disk 82. Note that the one tooth 74 of the one-toothed gear 73 lies in a position lower than where the protruded retainer portion 85 is confronted with the ring-shaped contact face 73a. The protruded retainer portion 85 does not interfere with the one tooth 74.

Figure 8:
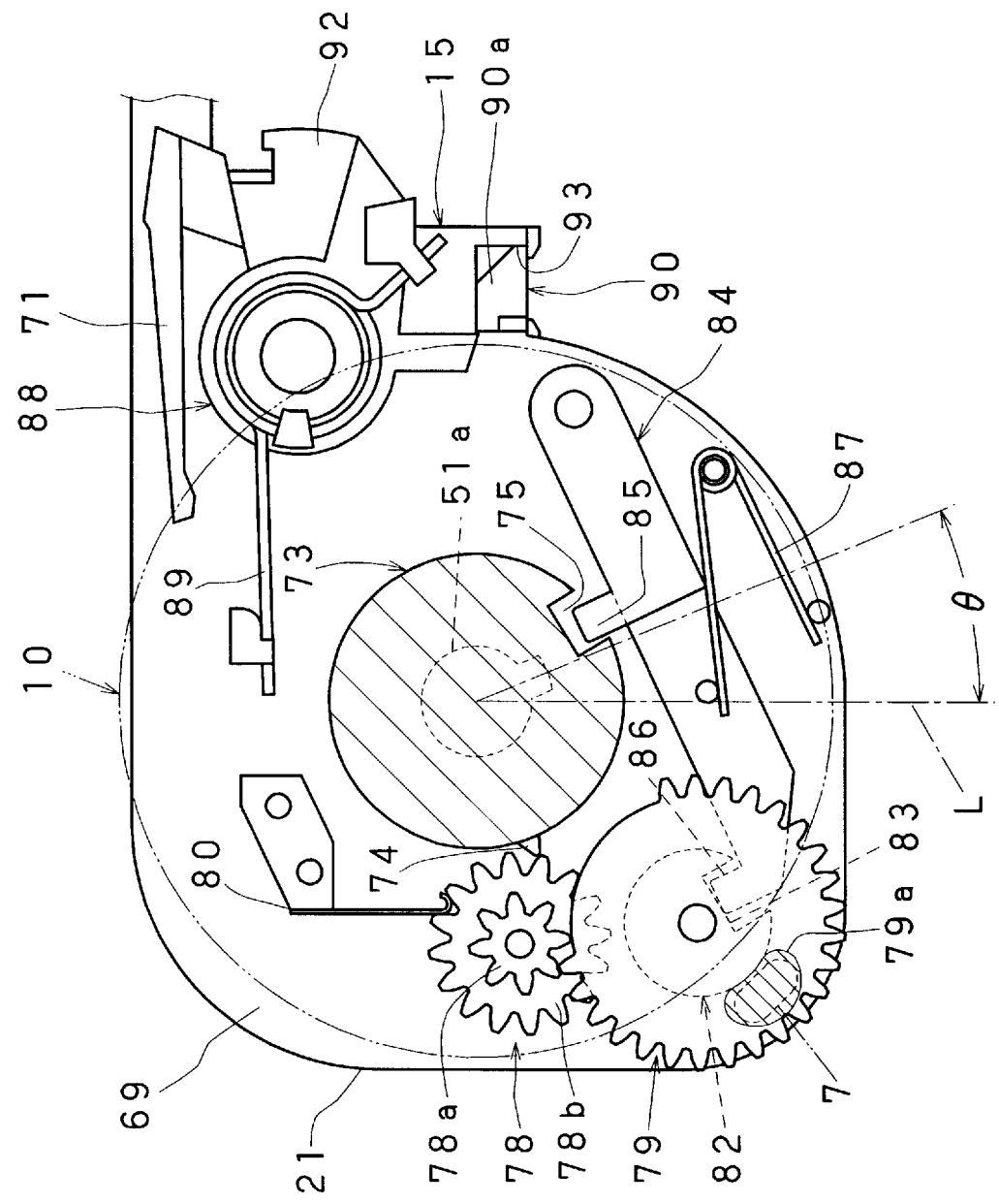
FIG. 8 is a top plan illustrating a state of operation of the position detector and the lock mechanism.

In FIG. 8, the winder wheel 10 has finished making rotations of the predetermined number. The indicia 79a comes to the underside of the finish indicator window 7. The detector cutout 83 comes confronted with the detector protruded portion 86. Thus the timing lever 84 swings slightly, to cause the protruded retainer portion 85 to contact the ring-shaped contact face 73a of the one-toothed gear 73. Then the winder wheel 10 is rotated further. During one or less rotation made by the winder wheel 10, the recessed retainer portion 75 is confronted with the protruded retainer portion 85. The recessed retainer portion 75 is confronted with the protruded retainer portion 85 only when the indicator plate 60 of the photo film cassette 14 is located behind the indicator opening 67c indicating the "Exposed" status, namely when the engaging hole 51a of the spool 51 is at the angle θ. The winder wheel 10 is stopped from rotating while the indicator plate 60 is kept behind the indicator opening 67c.

The cassette containing chamber 21 is further provided with a shutter rotating member 88, a spring 89 and a connection member 90, which cooperate to rotate the cassette shutter 53 toward the closed position. The shutter rotating member 88 is constituted by an engaging shaft 91 and a retainer lever 92 formed on the top of the engaging shaft 91. The engaging shaft 91 is inserted through a shaft receiving hole 69a in the top face 69 in a rotatable manner, and is engaged with the engaging portion 53a of the cassette shutter 53. The retainer lever 92 is biased by the spring 89 toward the closed position of the cassette shutter 53.

The connection member 90 associates the opening operation of the bottom lid 24 with rotation of the shutter rotating member 88 to the closed position of the cassette shutter 53. The connection member 90 has a retaining portion 90a formed on its top in a hook shape, and a claw 90b formed in its bottom. The connection member 90 is mounted in a vertically slidable manner in the inside of rail portions 93, which is disposed between the cassette containing chamber 21 and the light-shielding tunnel 20. The retaining portion 90a, when the connection member 90 is so mounted, comes protruded slightly above the top face 69. The retaining portion 90a is engaged with the retainer lever 92, and supports the shutter rotating member 88 in the open position of the cassette shutter 53 against the bias of the spring 89. The claw 90b is engaged with an engaging claw 94, which is disposed to protrude on an inner face of the bottom lid 24.

The bottom lid 24 is opened before the lens-fitted photo film unit 2 is removed from the photo film cassette 14. In the meantime the engaging claw 94 pulls the claw 90b to slide down the connection member 90. The retaining portion 90a is disengaged from the retainer lever 92. The shutter rotating member 88 being biased by the spring 89 is rotated to the closed position of the cassette shutter 53. The cassette shutter 53 is rotated to the closed position by use of the engaging shaft 91, so that the photo film cassette 14 is can be removed in an illuminated room, not in a dark room.

The shutter rotating member 88, when rotated to the closed position of the cassette shutter 53, is stopped because the retainer lever 92 contacts a root portion of the one-direction claw 71. There is no occurrence of a damage of the cassette shutter 53, as no excessive load is applied to the cassette shutter 53.

The operation of the above embodiment is described now. In a process of assembling parts of the lens-fitted photo film unit 2, a dark room is required for loading the lens-fitted photo film unit 2 with the photo film cassette 14. The photo film 12 being unexposed is pulled from the cassette shell 13 to form a photo film roll. The cassette shell 13 is inserted into the cassette containing chamber 21 while being moved in an axial direction. The photo film roll is inserted into the roll chamber 22 through its rear gap. An amount at which the photo film 12 is drawn from the cassette shell 13 is precisely controlled. The photo film 12 is drawn in such a manner from the cassette shell 13 that a virtual frame position prior to a first available frame position by one frame length is set on the exposure opening 20a. The drawing amount being so controlled in the factory, it is possible precisely to regularize the predetermined number of rotations to be made by the winder wheel 10 to finish winding the entirety of the photo film 12 into the cassette shell 13.

The lens-fitted photo film unit 2, of which various parts are assembled and the photo film cassette 14 is loaded, is inspected for various respects of performance, and packaged before the lens-fitted photo film unit 2 is shipped out. There is guidance information printed on a packaging bag or the outer sheet 4 of the lens-fitted photo film unit 2, for the purpose of having a user continue rotating the winder wheel 10 after all frames are exposed until the winder wheel 10 is locked.

On the top face 69 of the cassette containing chamber 21 of the lens-fitted photo film unit 2 being unused, the protruded retainer portion 85 of the timing lever 84 contacts the pheripheral face 82a of the cam disk 82. See FIG. 7. The shutter rotating member 88 is engaged with the connection member 90 and kept in the open position of the cassette shutter 53. The indicia 79a of the counter gear 79 is positioned to move to the underside of the finish indicator window 7 when the entirety of the photo film 12 is wound into the cassette shell 13.

While the shutter mechanism of the exposure unit 16 of FIG. 3 is charged, the retainer lever 38 is in the blocking position while biased by the lock spring 37. The lock claw 38d is engaged with the winder wheel 10 and the wind block claw 38a is engaged with the wind block cam 39c, to block rotation of the winder wheel 10 and the wind block cam 39c. The drop portion 38b of the retainer lever 38 is engaged with the rise portion 34b of the shutter drive lever 34 in the charged position, to retain the shutter drive lever 34 in the charged position against the bias of the release spring 35.

A user observes a field of view through the viewfinder 8, before depressing the shutter button 5. The push rod 5a of the shutter button 5 in FIG. 2 moves to push the drop rod 38c of the retainer lever 38. The retainer lever 38 is rotated to the non-blocking position against the bias of the lock spring 37 while the drop portion 38b still retains the rise portion 34b of the shutter drive lever 34.

The retainer lever 38 is rotated further toward the non-blocking position. The drop portion 38b is disengaged from the rise portion 34b of the shutter drive lever 34. The shutter drive lever 34, released from the retention in the charged position, is rotated toward the released position in the counterclockwise direction by the release spring 35. The knocker arm 34c of the shutter drive lever 34 knocks and swings the shutter blade between the base member 27 and the lens cover 29. The shutter blade, as biased in the direction to close the exposure opening, closes the exposure opening quickly.

To charge the shutter mechanism again, the winder wheel 10 is rotated in the winding direction counterclockwise in the drawing. The spool 51 is rotated to wind an exposed portion of the photo film 12 by one frame into the cassette shell 13.

The sprocket wheel 41 and the cam member 39 make half a rotation counterclockwise when the photo film 12 is moved and with bias of the plate spring 43. During the half rotation, the charge cam 39d pushes the push receiving portion 34a of the shutter drive lever 34 to rotate toward the charged position against the bias of the release spring 35. The two-toothed gear 39b of the cam member 39, making the half rotation, causes the counter plate 36 to rotate by one step.

The retainer lever 38 is biased by the lock spring 37 in the blocking position, but not rotated to the blocking position because of the contact of the wind block claw 38a with the wind block cam 39c. When the cam member 39 makes half a rotation to confront the notches 39f of the wind block cam 39c with the wind block claw 38a, the lock spring 37 causes the retainer lever 38 to rotate to the blocking position. The wind block claw 38a is engaged with the notches 39f to block rotation of the cam member 39. The lock claw 38d is engaged with the teeth 10a of the winder wheel 10, which is also kept from rotating.

The drop portion 38b of the retainer lever 38 is engaged with the rise portion 34b of the shutter drive lever 34 in the charged position, to retain the shutter drive lever 34 in the charged position. Again the shutter mechanism of the exposure unit 16 is charged, to stand by for taking an exposure in the lens-fitted photo film unit 2.

When the winder wheel 10 is rotated in the winding direction, the one tooth 74 of the one-toothed gear 73 comes in mesh with the bottom gear 78b of the speed reduction gear 78 of FIG. 7, which is rotated by one tooth as one step in the clockwise direction against the plate spring 80 in engagement. Rotation of the speed reduction gear 78 is transmitted by the top gear 78a to the counter gear 79, which is rotated by one step of a unit angle in the counterclockwise direction. Upon finish of winding one frame of the photo film 12 into the cassette shell 13, the drop portion 38b of the retainer lever 38 becomes engaged with the teeth 10a of the winder wheel 10 which is locked again.

Note that the timing lever 84 does not swing even through the recessed retainer portion 75 of the one-toothed gear 73 is confronted with the protruded retainer portion 85 of the timing lever 84 during rotation of the winder wheel 10, because the detector protruded portion 86 contacts the cam disk 82.

After a final frame is exposed, the winder wheel 10 is rotated. The perforations 12b and 12c of the photo film 12 is disengaged from the teeth 41a and 41b of the sprocket wheel 41. The cam 36b of the counter plate 36 in FIG. 3 comes in contact with the rise projection 38e of the retainer lever 38. The counter plate 36 and thus the cam member 39 stop rotating. The retainer lever 38 does not come to the blocking position, so that the winder wheel 10 becomes rotationally free.

When the user rotates the winder wheel 10 according to the guidance information on the packaging bag and the outer sheet 4, the cam disk 82 is rotated counterclockwise via the one-toothed gear 73, the speed reduction gear 78 and the counter gear 79 until the detector cutout 83 comes confronted with the detector protruded portion 86 of the timing lever 84. Thus the timing lever 84 is swung slightly by the torsion coil spring 87. The protruded retainer portion 85 comes in contact with the one-toothed gear 73.

The winder wheel 10 rotates further. During one or less rotation made by the winder wheel 10, the recessed retainer portion 75 of the one-toothed gear 73 is confronted with the protruded retainer portion 85. The detector protruded portion 86 is engaged with the detector cutout 83, and the protruded retainer portion 85 is engaged with the recessed retainer portion 75. The winder wheel 10 is stopped from rotating. The indicia 79a of the counter gear 79 stops under the finish indicator window 7. Then a state of having finished winding photo film can be confirmed by observation through the finish indicator window 7.

The lens-fitted photo film unit 2 being used is forwarded to a photo laboratory. The finish indicator window 7 is observed by a photofinishing operator, to confirm the finish of the entire winding of the photo film 12. After the confirmation, the lens-fitted photo film unit 2 is transferred and handled in a process of removing the photo film cassette 14. If the finish is not confirmed, then the winder wheel 10 is rotated so much that the winder wheel 10 becomes locked. Then the lens-fitted photo film unit 2 is handled in the removing process for the photo film cassette 14.

In the process of removing the photo film cassette 14, the bottom lid 24 is initially opened slightly. The connection member 90 is slid down by the opening movement of the bottom lid 24, and disengaged from the shutter rotating member 88. The shutter rotating member 88 is rotated by the spring 89 toward the closed position of the cassette shutter 53, which of course comes to the closed position due to the shutter rotating member 88. The latch lever 62 pushed by the cassette shutter 53 comes in mesh with the latch gear 59a of the latch member 59, to latch the spool 51.

The photo film cassette 14 of which the cassette shutter 53 is closed can be removed from the lens-fitted photo film unit 2 in an illuminated room. After removal of the photo film cassette 14, rotation of the spool 51 is blocked with the protruded retainer portion 85 engaged with the recessed retainer portion 75. The indicia of the "Exposed" status is unfailingly shown. Users are prevented from loading cameras erroneously with the photo film cassette 14 of this status.

Afterwards the photo film 12 is removed from the photo film cassette 14, and subjected to processes of development and printing. The photo film 12 being developed is rewound into the cassette shell 13 being identical. The indicator plate 60 of the cassette shell 13 is controlled to stop behind the indicator opening 67d to indicate the "Developed" status, before the cassette shell 13 and photographic prints are forwarded to the user.

Figure 9:
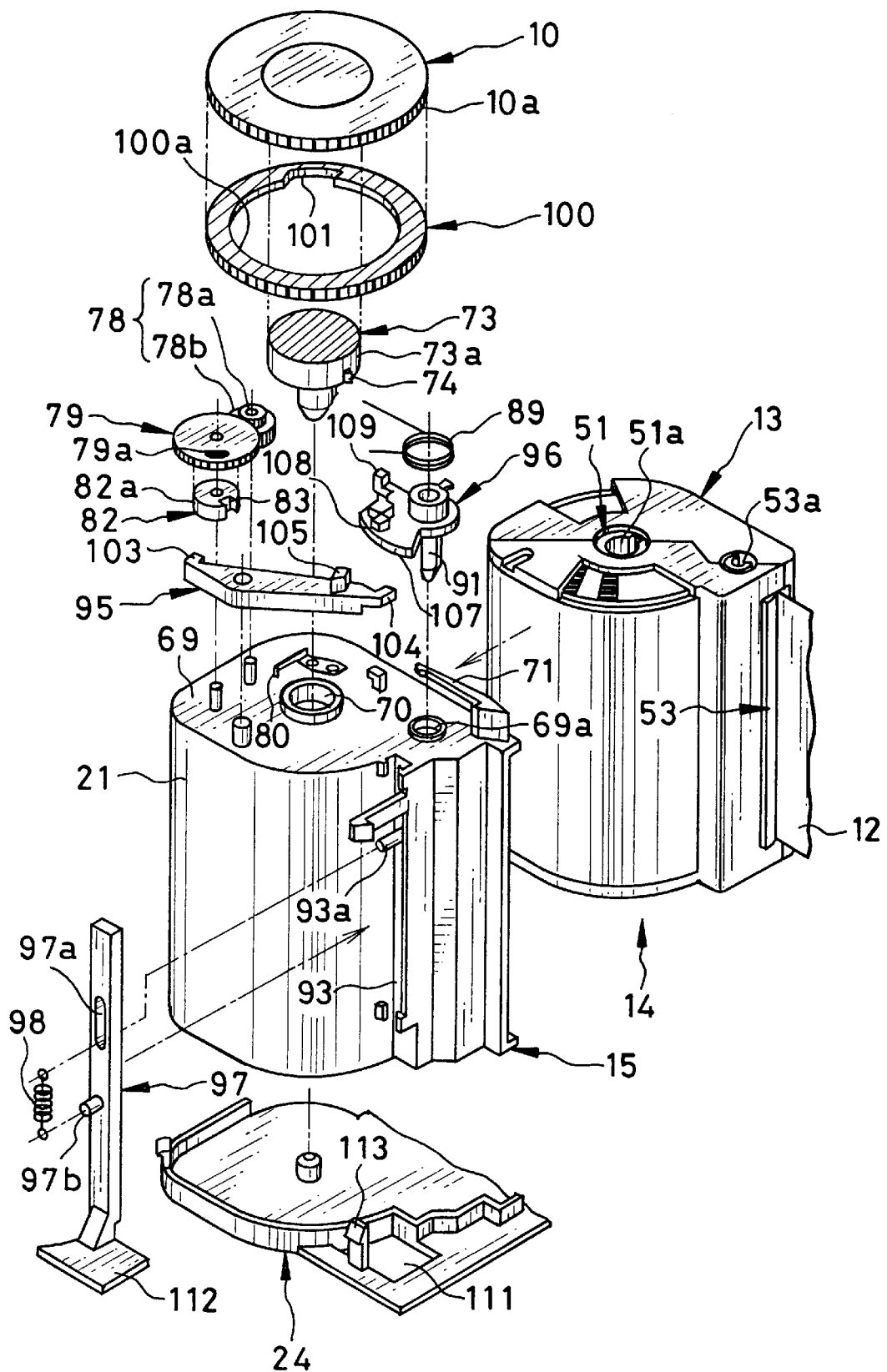
FIG. 9 is an exploded perspective illustrating another preferred embodiment of the position detector and the lock mechanism.
Figure 10:
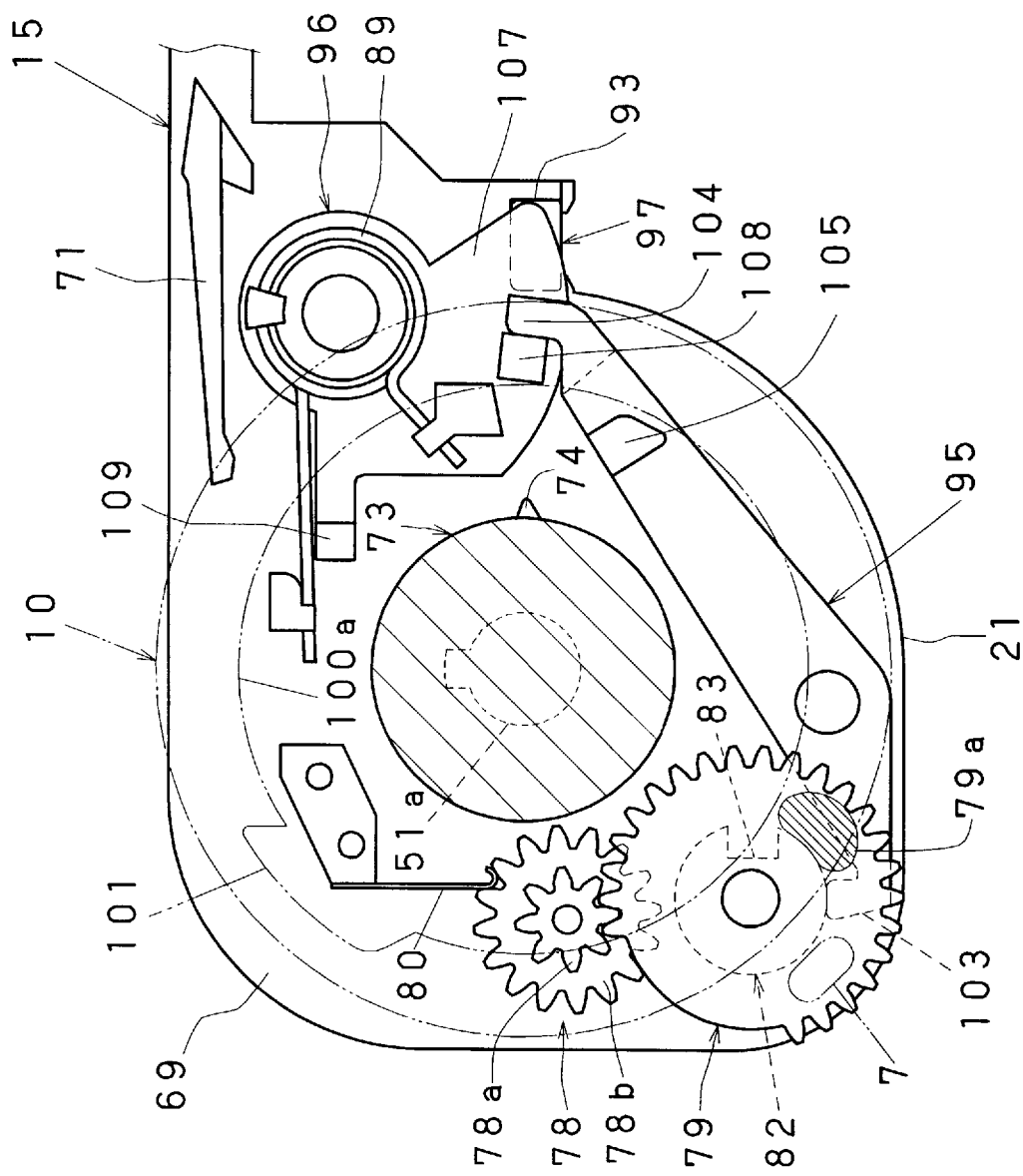
FIG. 10 is a top plan illustrating a state before the position detector and the lock mechanism are operated.

Referring now to FIGS. 9 and 10, another preferred embodiment is described. Elements similar to those of the above embodiment are designated with identical reference numerals. On the top face 69 of the cassette containing chamber 21 are disposed the winder wheel 10, the speed reduction gear 78, the counter gear 79, the plate spring 80, a timing lever 95, a shutter rotating member 96 and the spring 89. On the rail portions 93 in front of the cassette containing chamber 21, there are disposed a connection/lid member 97 and a slider coil spring 98. The connection/lid member 97 has an operation of indicating the completion of winding the entirety of the photo film 12 into the cassette shell 13 and the finish of closing the cassette shutter 53.

The one-toothed gear 73 or intermittent gear, and a cam ridge 100 are formed integrally with a bottom of the winder wheel 10. The one-toothed gear 73 is included in a position detector, which detects completion of rotation of the winder wheel 10 sufficient for winding the entirety of the photo film 12 into the cassette shell 13. The cam ridge 100 is included in a lock mechanism, which blocks rotation of the winder wheel 10 when one rotational position of the winder wheel 10 is detected after detection of the position detector. The cam ridge 100 is arc-shaped, and has a ring-shaped contact face 100a or inner face, and a recessed retainer portion 101 or lock cutout formed in the ring-shaped contact face 100a. The recessed retainer portion 101 is included in the lock mechanism.

Substantially a center of the timing lever 95 is supported on the top face of the cassette containing chamber 21 in a swingable manner. The timing lever 95 has a detector protruded portion 103 on its one end. The detector protruded portion 103 is included in a position detector, and confronted with the peripheral face 82a of the cam disk 82. The timing lever 95 has a sub protruded end 104 located opposite to the detector protruded portion 103. The sub protruded end 104 contacts the shutter rotating member 96 against the bias of the spring 89 and retains the shutter rotating member 96 in the open position of the cassette shutter 53. Furthermore a top of the timing lever 95 has a protruded retainer portion 105 or lock projection near to the sub protruded end 104. The protruded retainer portion 105 is included in the lock mechanism, and is confronted with the ring-shaped contact face 100a of the cam ridge 100.

Figure 11:
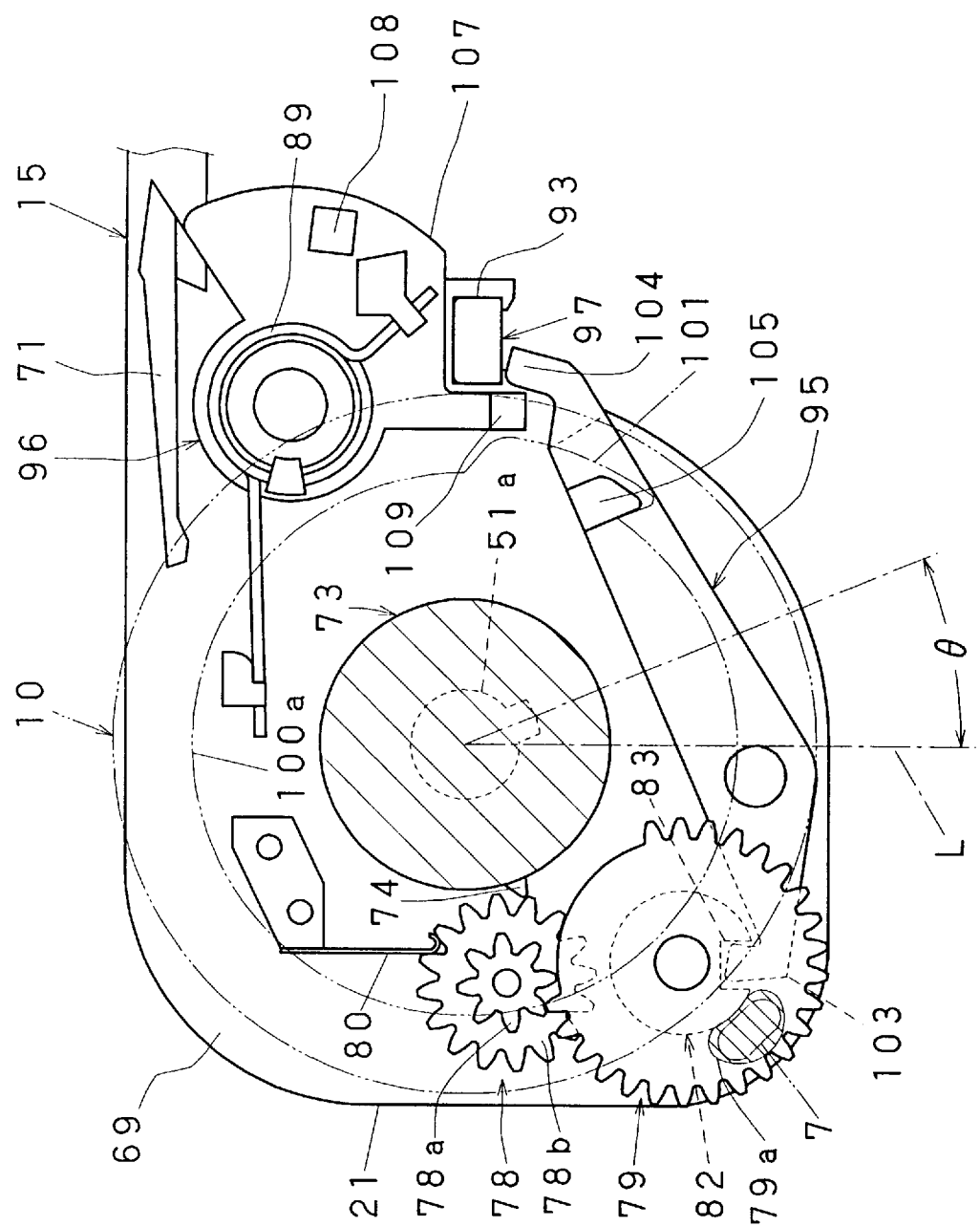
FIG. 11 is a top plan illustrating a state of operation of the position detector and the lock mechanism.

When the indicia 79a comes to the downside of the finish indicator window 7 upon the finish of the predetermined number of rotations, the detector cutout 83 comes confronted with the detector protruded portion 103, as depicted in FIG. 11. The timing lever 95 is swung slightly, to cause the protruded retainer portion 105 to contact the ring-shaped contact face 100a of the cam ridge 100. The winder wheel 10 is rotated further. During one or less rotation made by the winder wheel 10, the recessed retainer portion 101 is confronted with the protruded retainer portion 105. In the confrontation between the recessed retainer portion 101 and the protruded retainer portion 105, the indicator plate 60 of the photo film cassette 14 is positioned behind the indicator opening 67c indicating the "Exposed" status. Namely the key way 51b of the spool 51 is directed at the angle θ.

The shutter rotating member 96 is constituted by the engaging shaft 91 and a retainer lever 107 formed integrally with a top of the engaging shaft 91. The engaging shaft 91 is inserted through the shaft receiving hole 69a in a rotatable manner, and is engaged with the engaging portion 53a. The retainer lever 107 is biased by the spring 89 toward the closed position of the cassette shutter 53. The retainer lever 107, when in the open position of the cassette shutter 53, is partially disposed above the rail portions 93, and when rotated in the closed position of the cassette shutter 53, is away from the top of the rail portions 93.

On a top of the retainer lever 107, a projection 108 is formed, to contact the sub protruded end 104 of the timing lever 95 when the retainer lever 107 is in the open position of the cassette shutter 53. When the projection 108 contacts the sub protruded end 104, the timing lever 95 is biased in the clockwise direction. But the detector protruded portion 103 of the timing lever 95 contacts the peripheral face 82a of the cam disk 82 and is kept from swinging. The shutter rotating member 96 is kept in the open position of the cassette shutter 53.

On the top of the retainer lever 107, a projection 109 is formed, to contact the sub protruded end 104 when the retainer lever 107 is in the closed position of the cassette shutter 53. When the shutter rotating member 96 rotates to the closed position of the cassette shutter 53, the projection 109 pushes the sub protruded end 104 of the timing lever 95 so as to engage the detector protruded portion 103 unfailingly with the detector cutout 83.

The connection/lid member 97 has a slot 97a and a pin 97b, and when mounted in a slidable manner on the rail portions 93, a pin 93a disposed inside the rail portions 93 is inserted in the slot 97a. The slider coil spring 98 is connected between the pin 93a and the pin 97b to bias the connection/lid member 97 upwards. When the shutter rotating member 96 is in the open position of the cassette shutter 53, a top end of the connection/lid member 97 contacts the retainer lever 107 of the shutter rotating member 96 and is hindered from sliding up further. When the shutter rotating member 96 is rotated to the closed position of the cassette shutter 53, the connection/lid member 97 is slid up by the slider coil spring 98 as the retainer lever 107 has come away from above the rail portions 93.

There is formed an access opening 111 in the bottom of the housing 3 with the bottom lid 24 for receiving insertion of a tool or jig for opening the bottom lid 24. The access opening 111, when the lens-fitted photo film unit 2 is used, is closed by the connection/lid member 97, and open when the connection/lid member 97 is moved away. A bottom of the connection/lid member 97 has a bottom lid plate 112 integrally formed therewith. A reference numeral 113 designates a claw member engaged with the front cover 17 for keeping the bottom lid 24 closed reliably.

Figure 12:
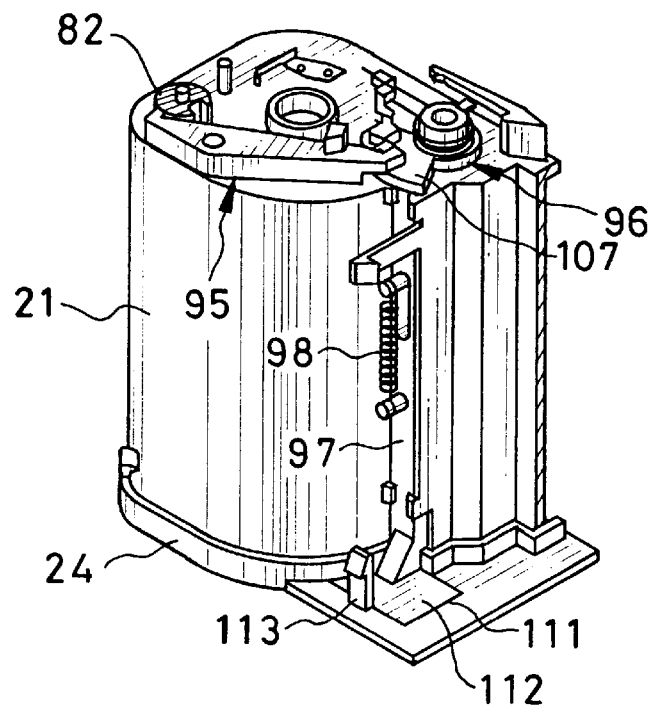
FIG. 12 is a perspective illustrating a state before a connection/lid member is operated.
Figure 13:
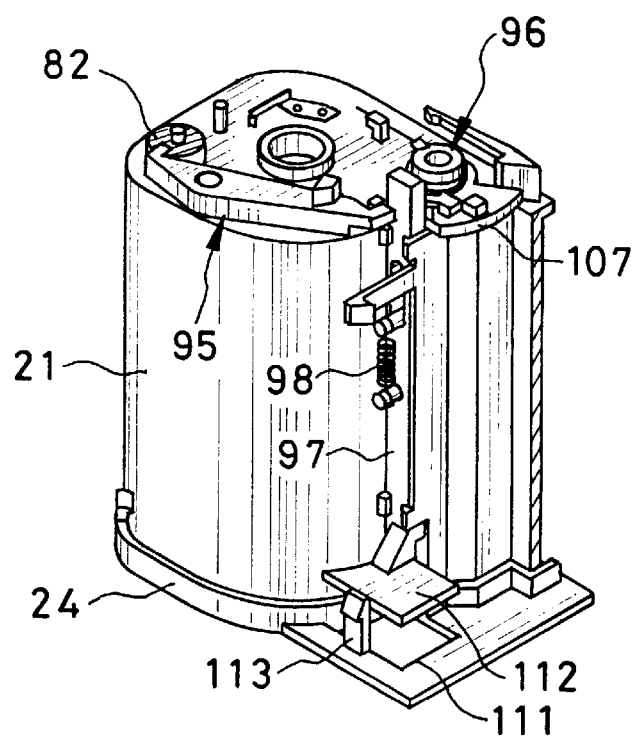
FIG. 13 is a perspective illustrating a state of operation of the connection/lid member.

In FIG. 12, the top end of the connection/lid member 97 contacts the shutter rotating member 96 while the shutter rotating member 96 is kept by the timing lever 95 in the open position of the cassette shutter 53. The bottom lid plate 112 closes the access opening 111 near to the bottom lid 24. When the shutter rotating member 96 is rotated to the closed position of the cassette shutter 53 as depicted in FIG. 13, the shutter rotating member 96 is not located above the connection/lid member 97 or above the rail portions 93. The connection/lid member 97 is slid by the slider coil spring 98 upwards. The bottom lid plate 112 is moved to open the access opening 111.

The operation of the above embodiment is described now. In FIG. 10, the top face 69 of the cassette containing chamber 21 of the lens-fitted photo film unit 2 being unused has the projection 108 contacting the sub protruded end 104 of the timing lever 95. The shutter rotating member 96 is kept in the open position of the cassette shutter 53 against the spring 89. In the timing lever 95 biased by the spring 89, the detector protruded portion 103 is caused to contact the peripheral face 82a of the cam disk 82. As the top of the connection/lid member 97 contacts the retainer lever 107 of the shutter rotating member 96, the connection/lid member 97 closes the access opening 111 as depicted in FIG. 12. The indicia 79a is positioned to move to the underside of the finish indicator window 7 when the photo film 12 is wound entirely into the cassette shell 13.

To use the lens-fitted photo film unit 2 for photography, a user observes a field of view through the viewfinder 8. The shutter button 5 is depressed to release the shutter. When the shutter release is finished, the winder wheel 10 is rotationally free. The winder wheel 10 is rotated in the counterclockwise direction. The one tooth 74 of the one-toothed gear 73 under the winder wheel 10 comes in mesh with the bottom gear 78b of the speed reduction gear 78. The speed reduction gear 78 is rotated by one tooth as one step in the clockwise direction against the plate spring 80 in engagement. Rotation of the speed reduction gear 78 is transmitted by the top gear 78a to the counter gear 79, which rotates by one step of a unit angle counterclockwise. Upon finish of winding one frame of the photo film 12, the winder wheel 10 is locked again by the one-frame winder mechanism of the exposure unit 16.

Note that the timing lever 95 does not swing even though the recessed retainer portion 101 is confronted with the protruded retainer portion 105 during rotation of the winder wheel 10, because the detector protruded portion 103 contacts the cam disk 82.

After a final frame is exposed, the winder wheel 10 is rotated. The one-frame winder mechanism of the exposure unit 16 is not locking the winder wheel 10. The user rotates the winder wheel 10 in accordance with guidance information printed on the packaging bag or the outer sheet member 4. The cam disk 82 has been rotated counterclockwise by cooperation of the one-toothed gear 73, the speed reduction gear 78 and the counter gear 79. The detector cutout 83 in the cam disk 82 is confronted with the detector protruded portion 103. Thus the timing lever 95 swings slightly, to cause the protruded retainer portion 105 to contact the ring-shaped contact face 100a of the cam ridge 100.

The winder wheel 10 is rotated further. During one or less rotation made by the winder wheel 10, the recessed retainer portion 101 is confronted with the protruded retainer portion 105. The bias of the shutter rotating member 96 engages the detector protruded portion 103 with the detector cutout 83, and the protruded retainer portion 105 with the recessed retainer portion 101, to block rotation of the winder wheel 10.

The timing lever 95 being swung, the shutter rotating member 96 is released from retention in the open position of the cassette shutter 53, and is rotated to the closed position of the cassette shutter 53 by the bias of the spring 89. When the cassette shutter 53 comes to the closed position, the latch lever 62 pushed by the cassette shutter 53 comes in mesh with the latch gear 59a of the latch member 59 to latch the spool 51.

The retainer lever 107 does not lie above the rail portions 93. The connection/lid member 97 is slid up by the slider coil spring 98. In FIG. 13, the bottom lid plate 112 is slid up with the connection/lid member 97 to open the access opening 111. Thus the open state of the access opening 111 signals information of the finish of entirely winding the photo film 12 into the cassette shell 13, and the finish of closing of the cassette shutter 53. The bottom lid 24 can be opened by use of a tool or jig through the access opening 111, to unload the photo film cassette 14 from the cassette containing chamber 21. It is advantageous with the access opening 111 to limit a position for insertion of an unloading tool or jig, because any of relevant parts would be damaged if the tool were forcibly inserted through an unwanted position. Efficiency in recycling parts of lens-fitted photo film units is heightened.

The photo film cassette 14 being removed has the spool 51 of which the indicator plate 60 is stopped behind the indicator opening 67c, indicating the "Exposed" status. The user is caused to pay attention for avoiding of erroneous loading of the photo film cassette 14.

Figure 14:
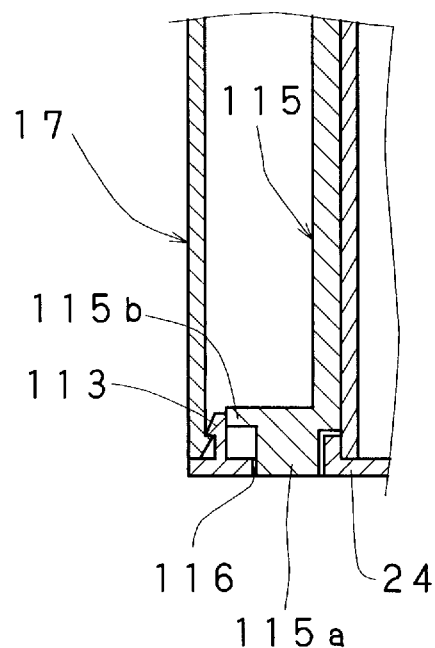
FIG. 14 is a cross section, partially cut away, illustrating a state before another preferred example of connection/lid member is operated.

Furthermore, a connection/lid member with indication is usable additionally for a lock mechanism of the bottom lid 24. In FIG. 14, the claw member 113 of the bottom lid 24 engageable with the front cover 17 is formed with high flexibility. When a lid plate 115a of a connection/lid member 115 closes an access opening 116, a projection 115b of the connection/lid member 115 pushes the claw member 113, so as to engage the claw member 113 with the front cover 17 with higher firmness. If one wishes to open the bottom lid 24 forcibly, the claw member 113 is not disengaged from the front cover 17. The bottom lid 24 is protected from being opened by inadvertent operation.

Figure 15:
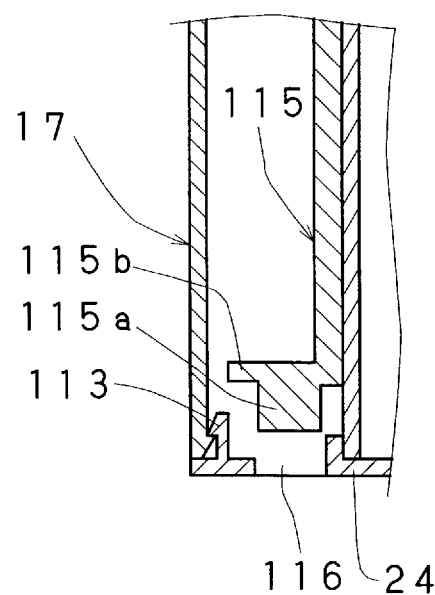
FIG. 15 is a cross section, partially cut away, illustrating a state of operation of the connection/lid member.

In FIG. 15, the lid plate 115a is moved to open the access opening 116 when the connection/lid member 115 is slid up. A unloading tool or jig can be inserted through the access opening 116. The claw member 113 is released from being pushed by the projection 115b of the connection/lid member 115. The claw member 113 can be easily flexed to allow opening the bottom lid 24. Note that it is possible to use an alternate structure, in which the claw member 113 may be formed in a state readily disengageable from the front cover 17, and the connection/lid member 115 may push the claw member 113 so as to engage the claw member 113 with the front cover 17.

Figure 16:
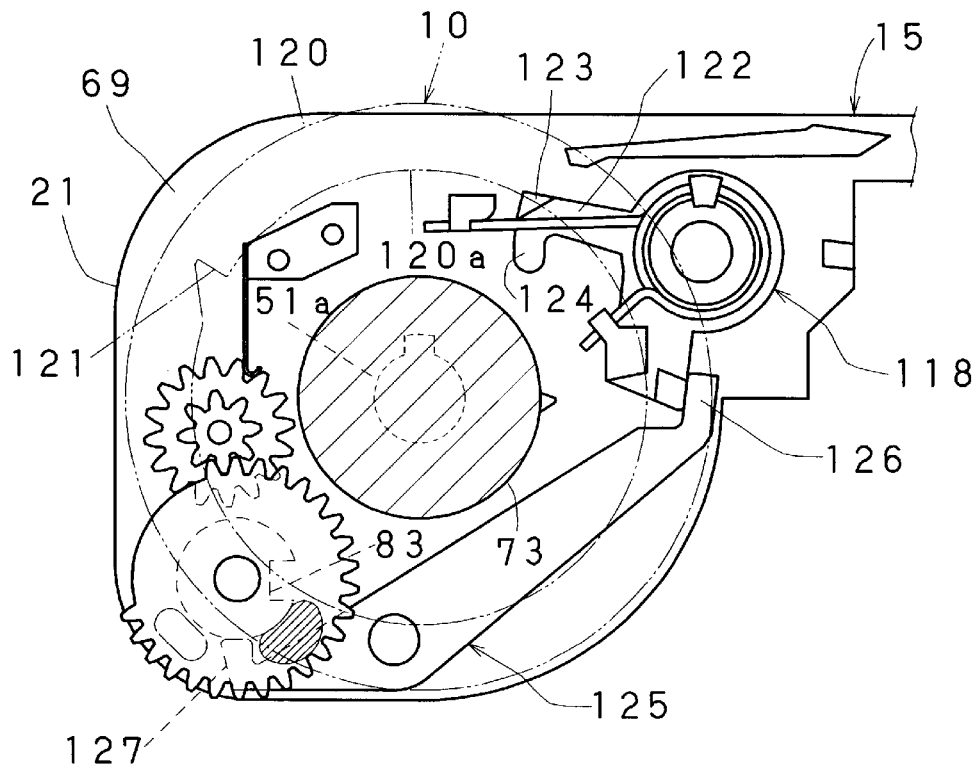
FIG. 16 is a top plan illustrating a state of another preferred embodiment before a position detector and a lock mechanism are operated.
Figure 17:
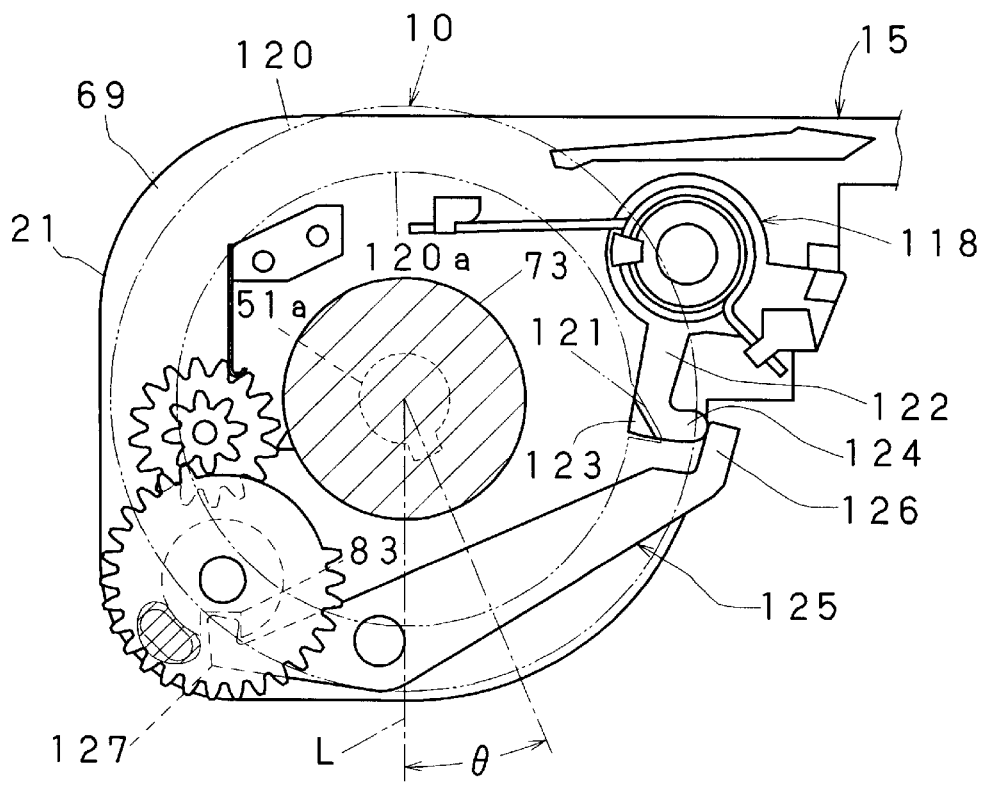
FIG. 17 is a top plan illustrating a state of operation of the position detector and the lock mechanism.

Referring now to FIGS. 16 and 17, still another embodiment is described. Elements similar to those of the above embodiments are designated with identical reference numerals. There is a shutter rotating member 118, which is rotated toward the closed position of the cassette shutter 53, to lock rotation of the winder wheel 10.

Under the winder wheel 10 is formed a cam ridge 120, which has a ring-shaped contact face 120a or inner face. A recessed retainer portion 121 or lock cutout is formed in the ring-shaped contact face 120a, and included in a lock mechanism. The shutter rotating member 118 has an arm portion 122 extending radially. A protruded retainer portion 123 or lock projection is formed in an end of the arm portion 122, and included in the lock mechanism. The arm portion 122 has a projection 124, which pushes a block projection 126 of a timing lever 125 when rotated to the closed position of the cassette shutter 53, to render engagement reliable between a detector projection 127 and the detector cutout 83.

The timing lever 125 is swung to release the cassette shutter 53 from retention in the open position. The shutter rotating member 118 responsively rotates toward the closed position of the cassette shutter 53. The protruded retainer portion 123 of the arm portion 122 of the shutter rotating member 118 contacts the ring-shaped contact face 120a of the cam ridge 120. The winder wheel 10 is rotated further. During one or less rotation made by the winder wheel 10, the protruded retainer portion 123 comes engaged with the recessed retainer portion 121. In the engagement of the protruded retainer portion 123 and the recessed retainer portion 121, the indicator plate 60 of the photo film cassette 14 is positioned behind the indicator opening 67c indicating the "Exposed" status.

Figure 18:
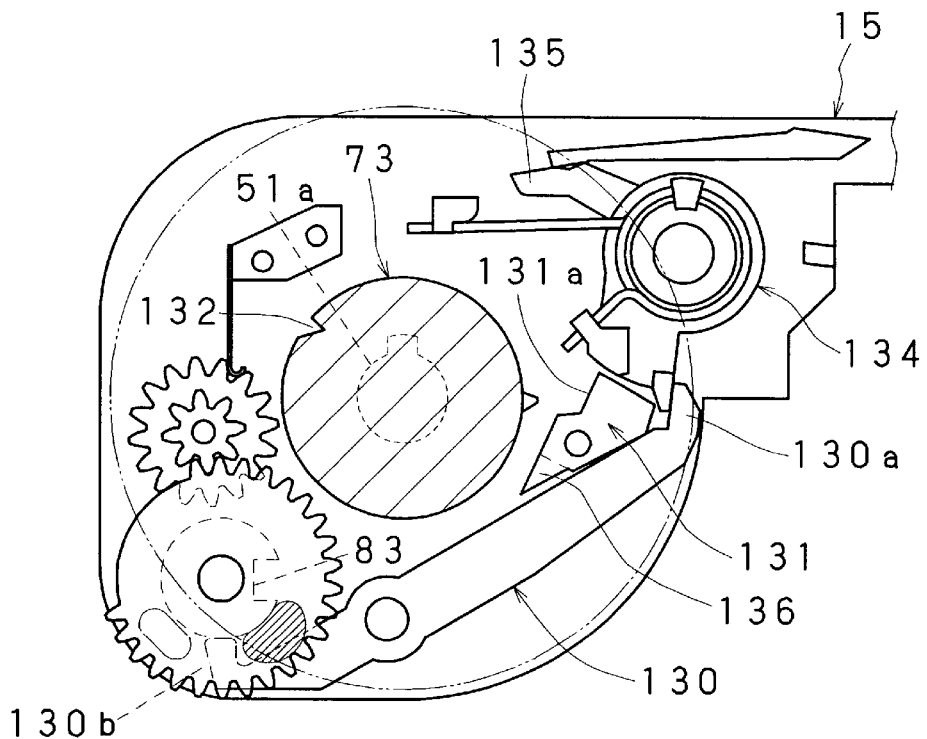
FIG. 18 is a top plan illustrating a state of still another preferred embodiment before a position detector and a lock mechanism are operated.
Figure 19:
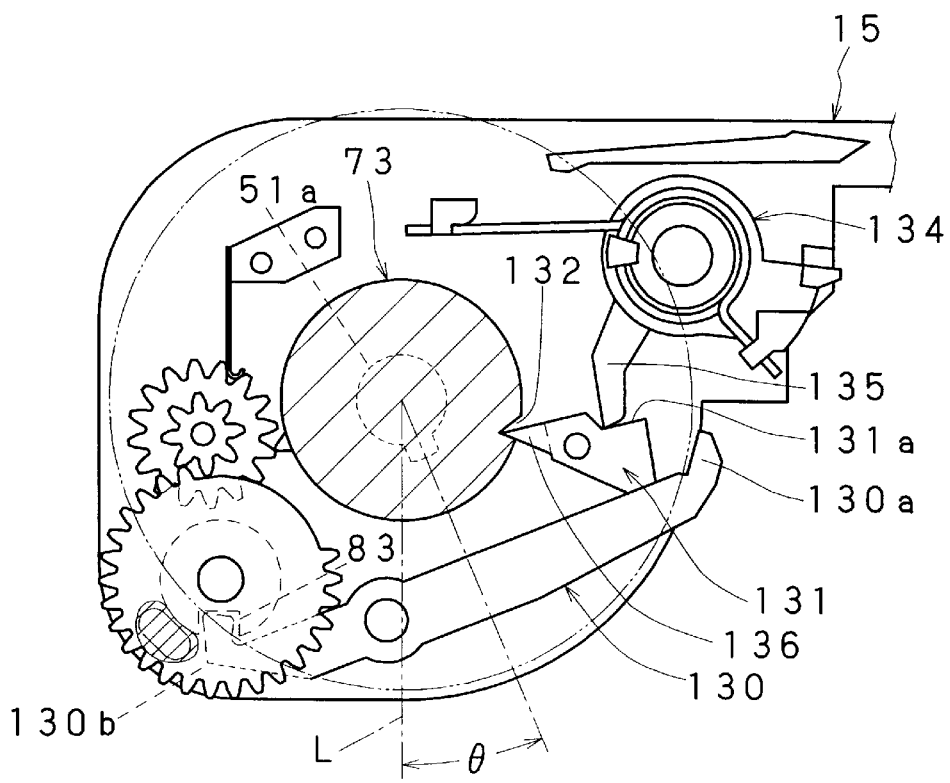
FIG. 19 is a top plan illustrating a state of operation of the position detector and the lock mechanism.
Figure 20:
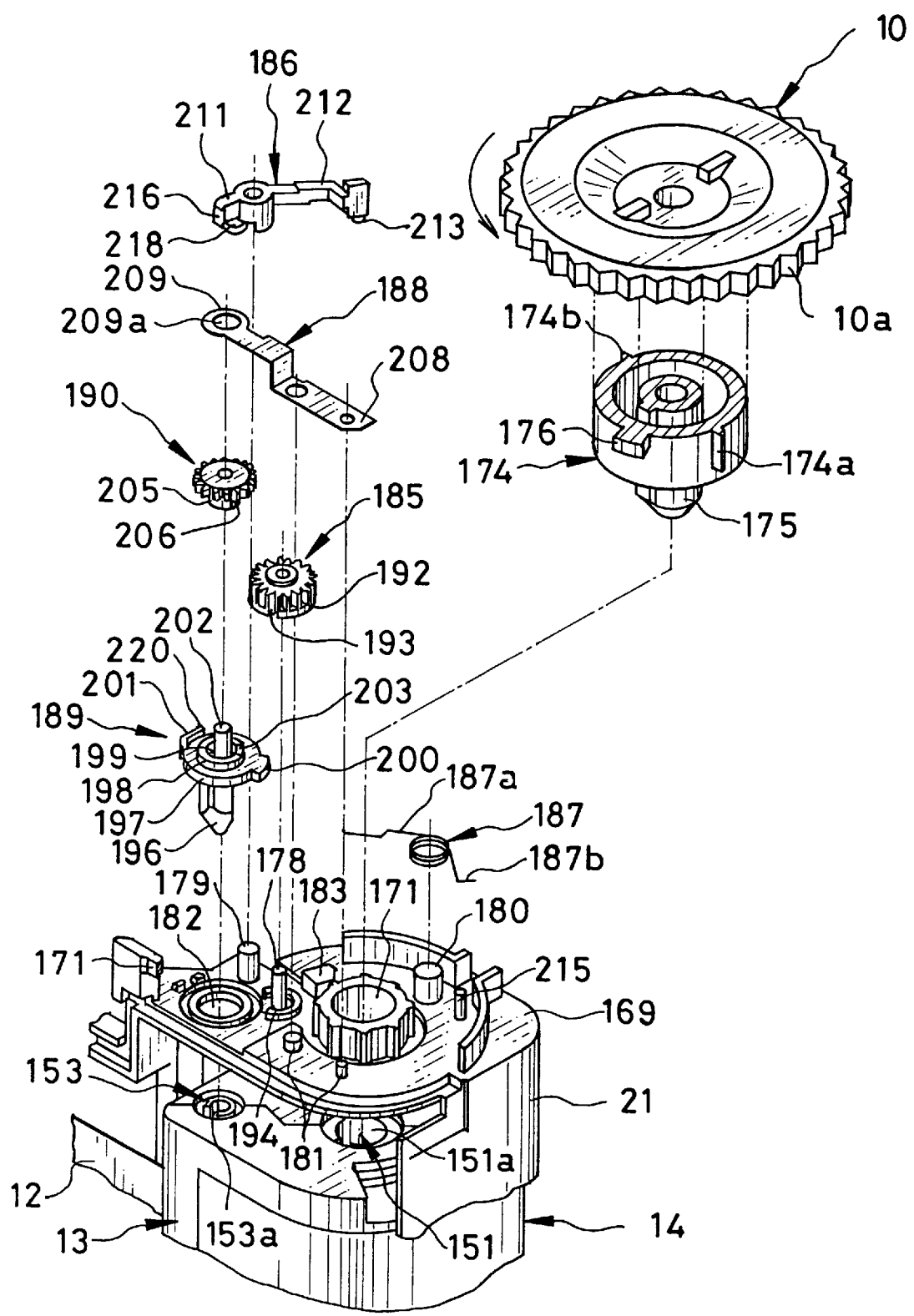
FIG. 20 is an exploded perspective illustrating a shutter rotating member, a transmission mechanism and a wheel lock mechanism in accordance with an embodiment in which rotation of the winder wheel closes a cassette shutter.
Figure 21:
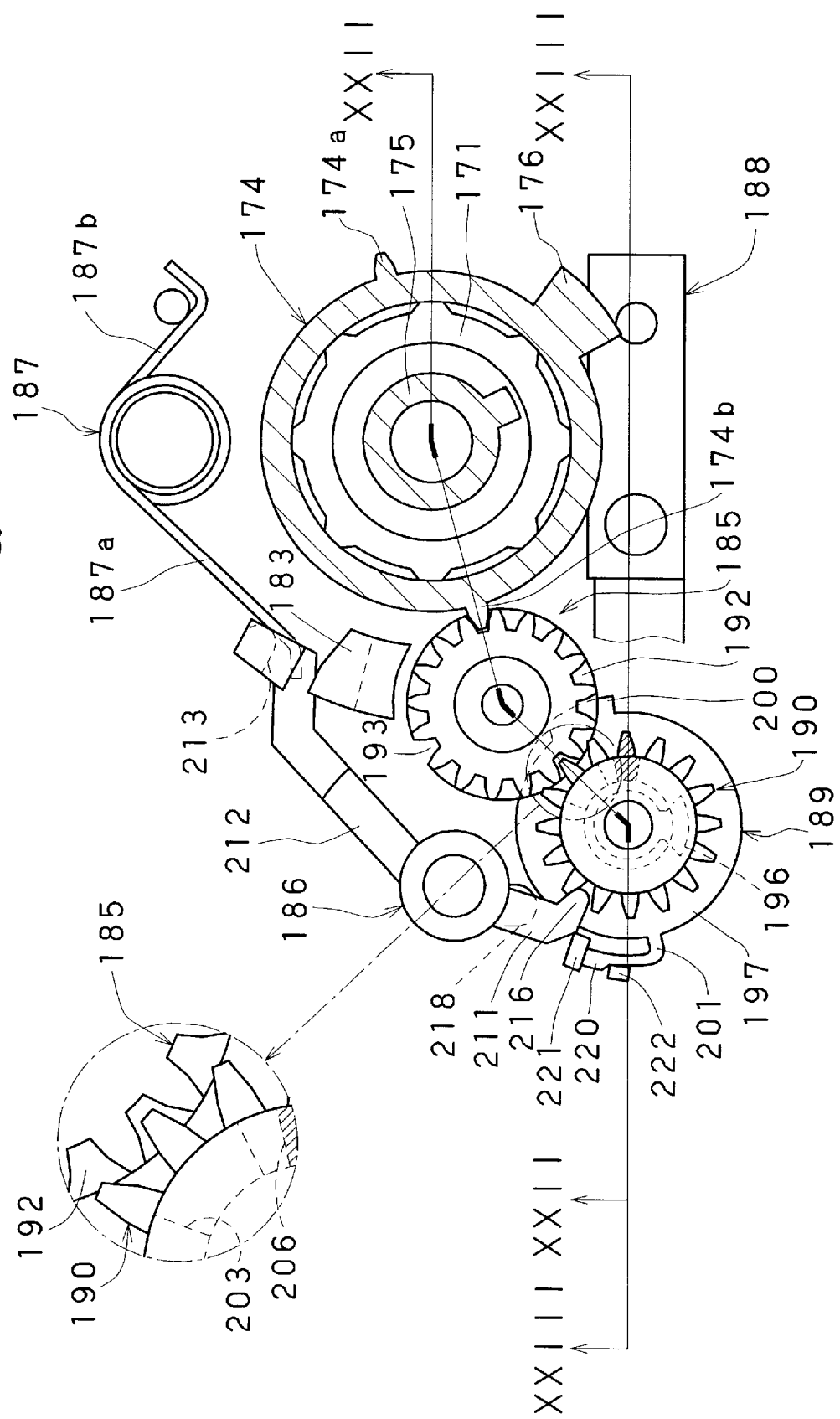
Figure 22:
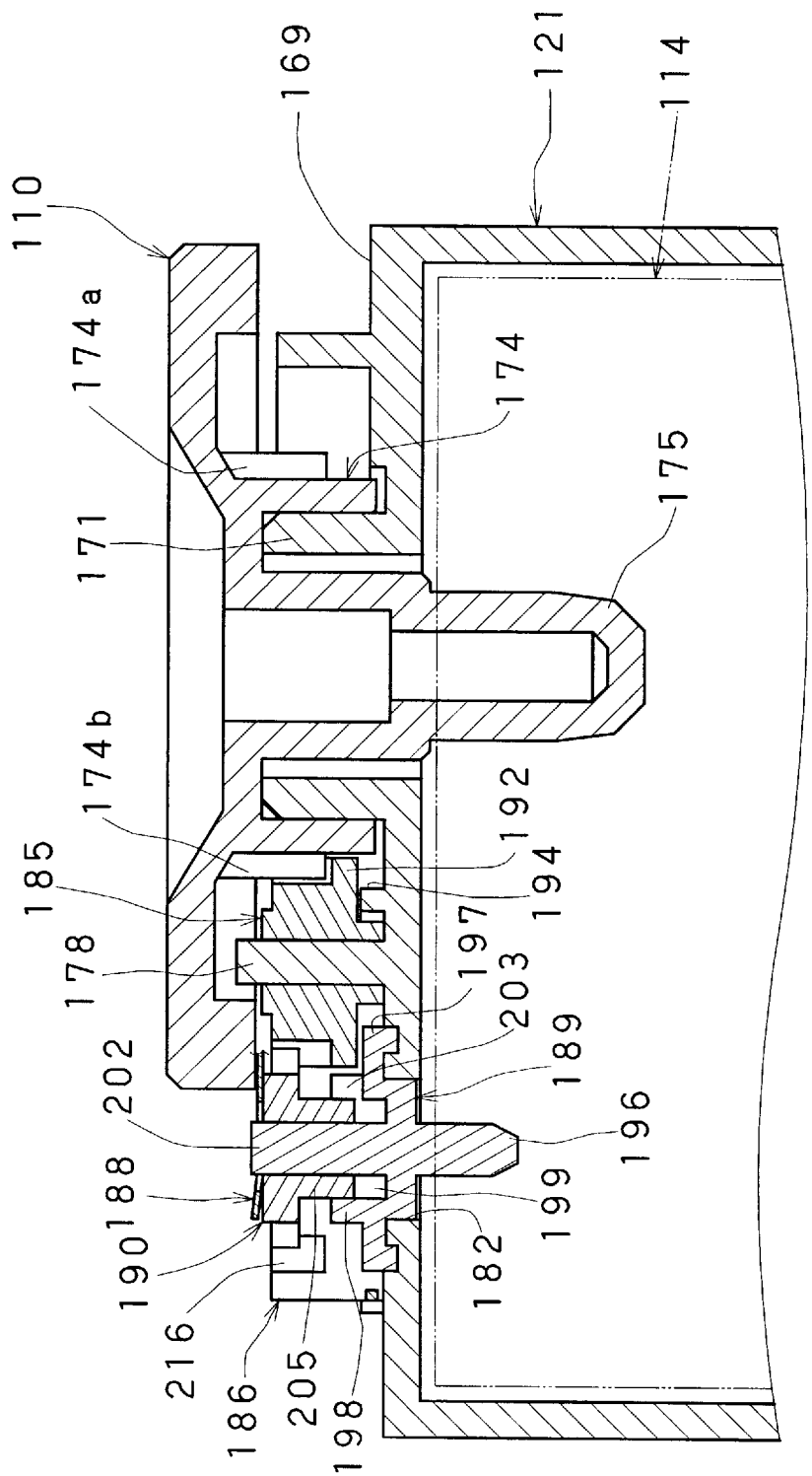
FIG. 22 is a section taken on line XXII—XXII in FIG. 21, illustrating the transmission mechanism.
Figure 23:
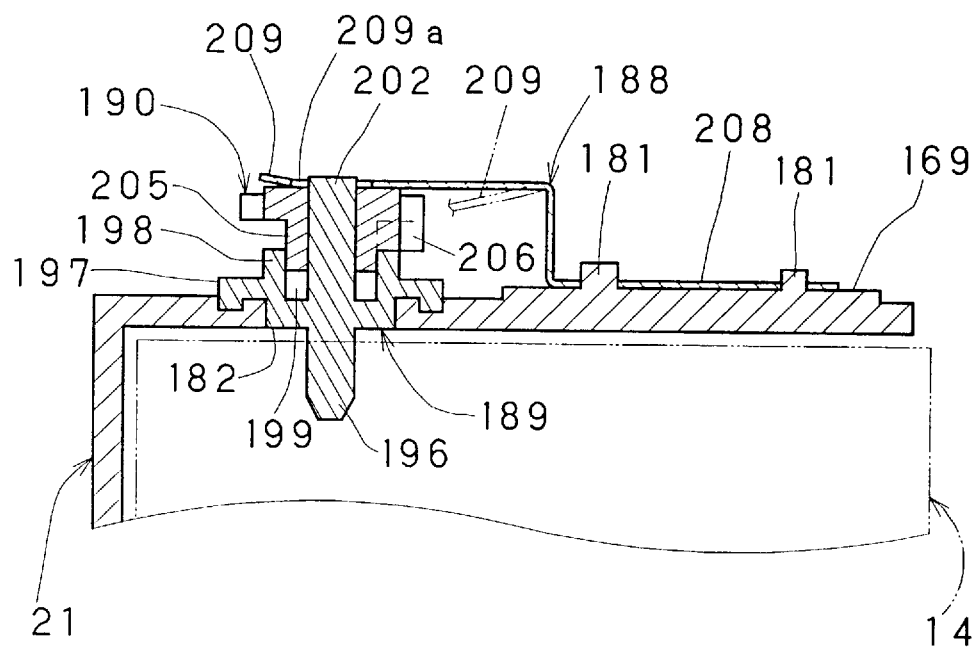
FIG. 23 is a section taken on line XXIII—XXIII in FIG. 21, illustrating the transmission mechanism.
Figure 24:
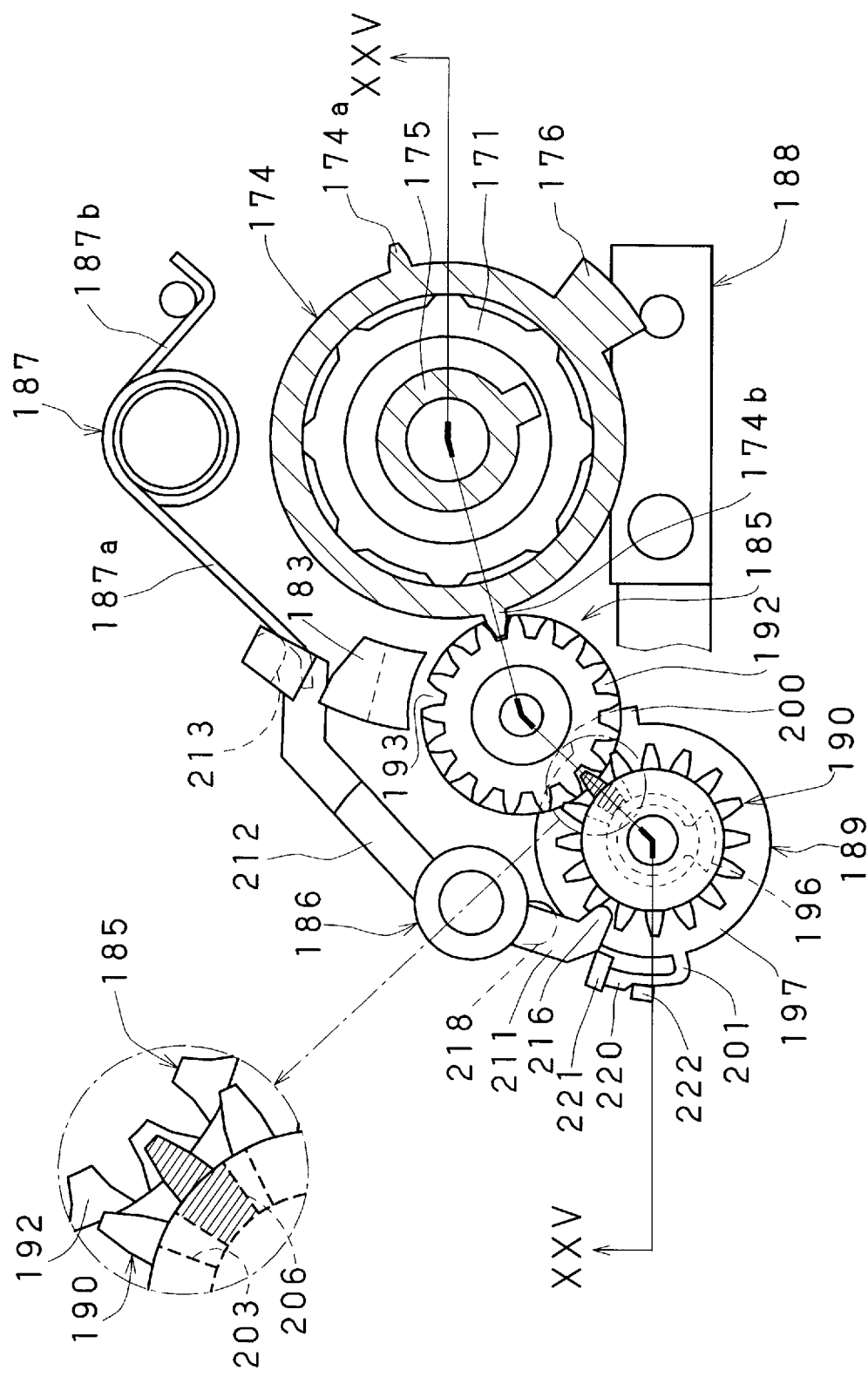

Referring to FIGS. 18 and 19, still another preferred embodiment is described. Elements similar to those of the above embodiments are designated by identical reference numerals. There is a lock member 131 of a wedge shape is disposed in a rotatable manner near to a timing lever 130. After winding the entirety of the photo film 12, the lock member 131 is rotated in the clockwise direction. A recessed retainer portion 132 or lock cutout is formed in the ring-shaped contact face 73a of the one-toothed gear 73, and included in the lock mechanism. The lock member 131 is engaged with the recessed retainer portion 132 to block rotation of the winder wheel 10.

There is a push projection 135 disposed on a shutter rotating member 134 to project in a radial direction. The shutter rotating member 134, when a detector projection 130b of the timing lever 130 comes confronted with the detector cutout 83, pushes and swings a block projection 130a of the timing lever 130. The shutter rotating member 134 rotates to the closed position of the cassette shutter 53. At the same time the push projection 135 pushes a face 131a of the lock member 131.

The lock member 131, when the face 131a is pushed, is rotated in the clockwise direction to push the timing lever 130. The lock member 131 has a protruded retainer portion 136 or distal end, which is included in a lock mechanism. The protruded retainer portion 136 is caused to contact the ring-shaped contact face 73a of the one-toothed gear 73. Accordingly the protruded retainer portion 136 becomes engaged with the recessed retainer portion 132 during one or less rotation made by the winder wheel 10. The recessed retainer portion 132 is formed in such a position that, when the indicator plate 60 of the photo film cassette 14 is behind the indicator opening 67c to indicate the "Exposed" status, the recessed retainer portion 132 is engageable with the lock member 131. The photo film cassette 14 after the removal unfailingly indicates the "Exposed" status.

EXAMPLE

An example of a ratio of the speed reduction between the top gear 78a and the counter gear 79 is 8/30. The bottom gear 78b has a pitch circle diameter D=5.4 mm, a module m=0.3, and a tooth number z=16. If the photo film 12 is a type for 25 exposures for example, 29 rotations of the winder wheel 10 are estimated as rotating amount required for winding the entirety of the photo film 12. A rotating amount of the counter gear 79 is determined as:

$$8/30 \times 22.5 \times 29 = 174(°).$$

Consequently the counter gear 79 should have the indicia 79a and the detector cutout 83 rotationally disposed 174 degrees away from start positions of the counter gear 79.

If the photo film 12 to be contained has a different number of available frames or includes a photo film support of a different material, there is a change in a rotating amount of the winder wheel 10 required for winding the entirety of the photo film 12 into the cassette shell 13. But the counter gear 79 can be modified only with suitably changed positions of the indicia 79a and the detector cutout 83. All the other parts can be used without changes. If the photo film 12 is a type for 40 exposures for example, 45 rotations of the winder wheel 10 are estimated as rotating amount required for winding the entirety of the photo film 12. A rotating amount of the counter gear 79 is determined as:

$$8/30 \times 22.5 \times 45 = 270(°).$$

Consequently the counter gear 79 should have the indicia 79a and the detector cutout 83 rotationally disposed 270 degrees away from start positions of the counter gear 79.

In the first one of the above embodiments, locking of the winder wheel 10 and closing of the cassette shutter 53 are separately operated. However they may be linked up in a manner similar to the second, third and fourth ones of the embodiments. In the second to fourth embodiments, the winder wheel 10 is locked by use of rotational force of the shutter rotating member 96, 118, 134 toward the closed position of the cassette shutter 53. However the winder wheel 10 may be locked by a spring used separately from the shutter rotating member 96, 118, 134. The connection/lid member 97, 115 is used in the second embodiments, but may be used in the other embodiments.

In the above embodiments, the connection/lid member 97, 115 is slid upwards in response to rotation to the shutter rotating member 88, 96, 118, 134 to the closed position. Alternatively the connection/lid member 97, 115 may be slid downwards in response to rotation to the shutter rotating member 88, 96, 118, 134 to the closed position. Furthermore the connection/lid member 97, 115 may be moved in response to a swing of the timing lever 84, 95, 125, 130. Note that, when the access opening 111, 116 is opened under the housing 3 after the entire photo film winding, it is likely that dust enter the housing 3, or that a user feels like opening the bottom lid 24 personally by himself. It is preferable that a sticker or label is attached to cover and close the access opening 111, 116 in an externally invisible manner. It is possible for a photofinisher to touch the sticker manually to check an open state of the access opening 111, 116.

In the above embodiments, the recessed retainer portion and the protruded retainer portion are combined to lock the winder wheel 10. However the winder wheel 10 may be locked by a recess instead of the above protrusion and a protrusion instead of the above recess in an engageable manner with one another, and also locked by a combination of two protrusions engageable with one another. In the above embodiments, the retainer portions are disposed in a radial direction of the winder wheel. However retainer portions may be disposed to protrude or retreat in a direction of thickness of the winder wheel.

In the above embodiments, the speed reduction gear 78 is used between the one-toothed gear 73 and the counter gear 79. However it is possible to omit the speed reduction gear 78, typically if the photo film has a length entirely windable in a range of all the teeth of the counter gear 79. If the housing 3 has a space for incorporating the counter gear 79 with a sufficient number of teeth, the lens-fitted photo film unit may lack the speed reduction gear 78. In the above embodiments, the indicia 79a is formed on the counter gear 79. The finish indicator window 7 is formed in the front cover for appearance of the indicia 79a. Alternatively the lens-fitted photo film unit may lack the indicia 79a and the finish indicator window 7, typically if the entire photo film winding is recognized only with the locked state of the winder wheel 10, or if the connection/lid member 97, 115 is available and effective.

To indicate the finish of entirely winding the photo film 12 and the finish of the closing of the cassette shutter 53, it is possible to use a swinging position of the timing lever 84, 95, 125, 130, or a rotating position of the shutter rotating member 88, 96, 118, 134 in a manner visible outside the housing 3.

In the above embodiments, the lens-fitted photo film units is pre-loaded with a photo film cassette of the IX240 type of which rotation of the spool causes a leader of the photo film to advance to the outside. Alternatively a photo film cassette of the 135 type may used in the present invention.

Referring now to FIGS. 20–29, another preferred embodiment is described, in which a cassette shutter in a cassette shell is closed by a final rotational operation of a winder wheel of a lens-fitted photo film unit. Elements similar to those of the above embodiments are designated with identical reference numerals. In a process of manufacturing a lens-fitted photo film unit, the winder wheel 10, a counter gear 185 and an intermediate gear 190 are mounted on a top face 169 of the cassette containing chamber 21 of a housing. Rotational angles at which those should be positioned are different according to differences in the length of the photo film 12. The winder wheel 10, the counter gear 185 and the intermediate gear 190, before being placed on the top face 169, are suitably adjusted in their positions in view of the number of the available frames of the photo film 12. A shutter rotating member 189 is disposed on a shaft receiver 182 while a protruded end 220 of a positioning member 201 is inserted between projections 221 and 222.

In a process of assembling parts of the lens-fitted photo film unit, a dark room is required for loading the lens-fitted photo film unit with the photo film cassette 14. The photo film 12 being unexposed is pulled from the cassette shell 13 to form a photo film roll. The cassette shell 13 is inserted into the cassette containing chamber 21 while moved in an axial direction. The photo film roll is inserted into a photo film roll chamber through its rear gap. An amount at which the photo film 12 is drawn from the cassette shell 13 is precisely controlled. The photo film 12 is drawn in such a manner from the cassette shell 13 that a virtual frame position prior to a first available frame position by one frame length is set on an exposure opening. The drawing amount being so controlled in the factory, it is possible precisely to regularize the predetermined number of rotations to be made by the winder wheel 10 to finish winding the entirety of the photo film 12 into the cassette shell 13.

The lens-fitted photo film unit, of which various parts are assembled and the photo film cassette 14 is loaded, is inspected for various respects of performance, and packaged before being shipped out. When a user purchases the lens-fitted photo film unit, he or she rotates the winder wheel 10 to charge the shutter device. There is guidance information printed on a packaging bag or an outer sheet member of the lens-fitted photo film unit, for the purpose of having the user continue rotating the winder wheel 10 after all frames are exposed until the winder wheel 10 is locked.

The shutter mechanism is charged for the lens-fitted photo film unit to stand by for taking an exposure. In FIGS. 21a–23, an engaging projection 216 of a lock lever 186 is engaged with the intermediate gear 190 on the top of the cassette containing chamber 21, to keep the intermediate gear 190 and the counter gear 185 from rotating accidentally. In the shutter rotating member 189, the protruded end 220 of the positioning member 201 is squeezed between the projections 221 and 222, to keep the shutter rotating member 189 in an open position of a cassette shutter 153 without being rotated by friction of the intermediate gear 190. A plate spring 188 pushes the intermediate gear 190 downwards.

When the winder wheel 10 is rotated in the winding direction, a two-toothed gear 174 under the winder wheel 10 rotates together in the counterclockwise direction. Two teeth 174a and 174b of the two-toothed gear 174 causes the counter gear 185 to rotate clockwise. The counter gear 185 rotates the intermediate gear 190 counterclockwise. The intermediate gear 190 swings the lock lever 186 against the bias of a torsion coil spring 187 while a bottom face of a connecting projection 206 contacts a top face of a ridge 198.

Figure 25:
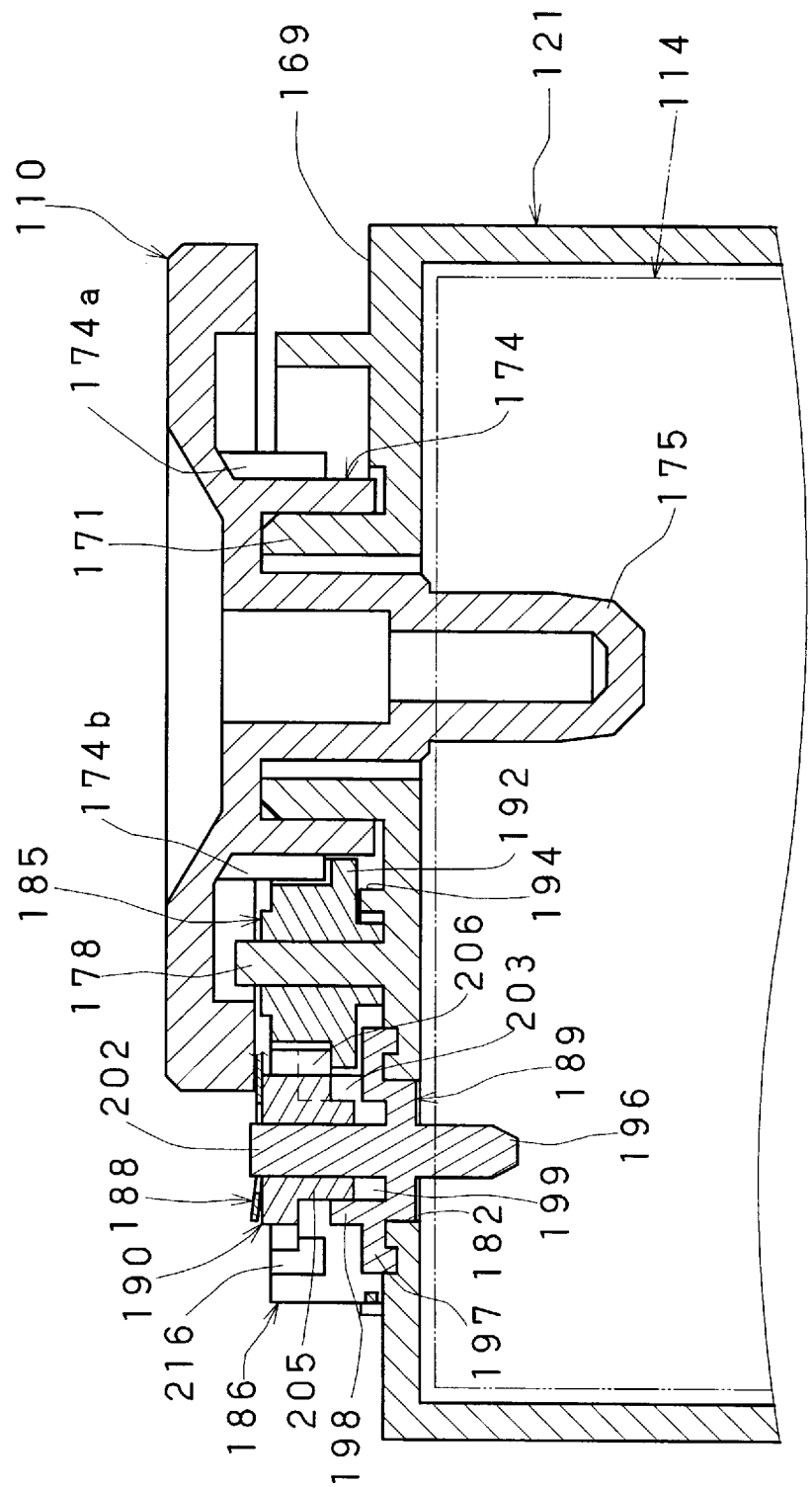
FIG. 25 is a section taken on line XXV—XXV in FIG. 24, illustrating the transmission mechanism.
Figure 26:
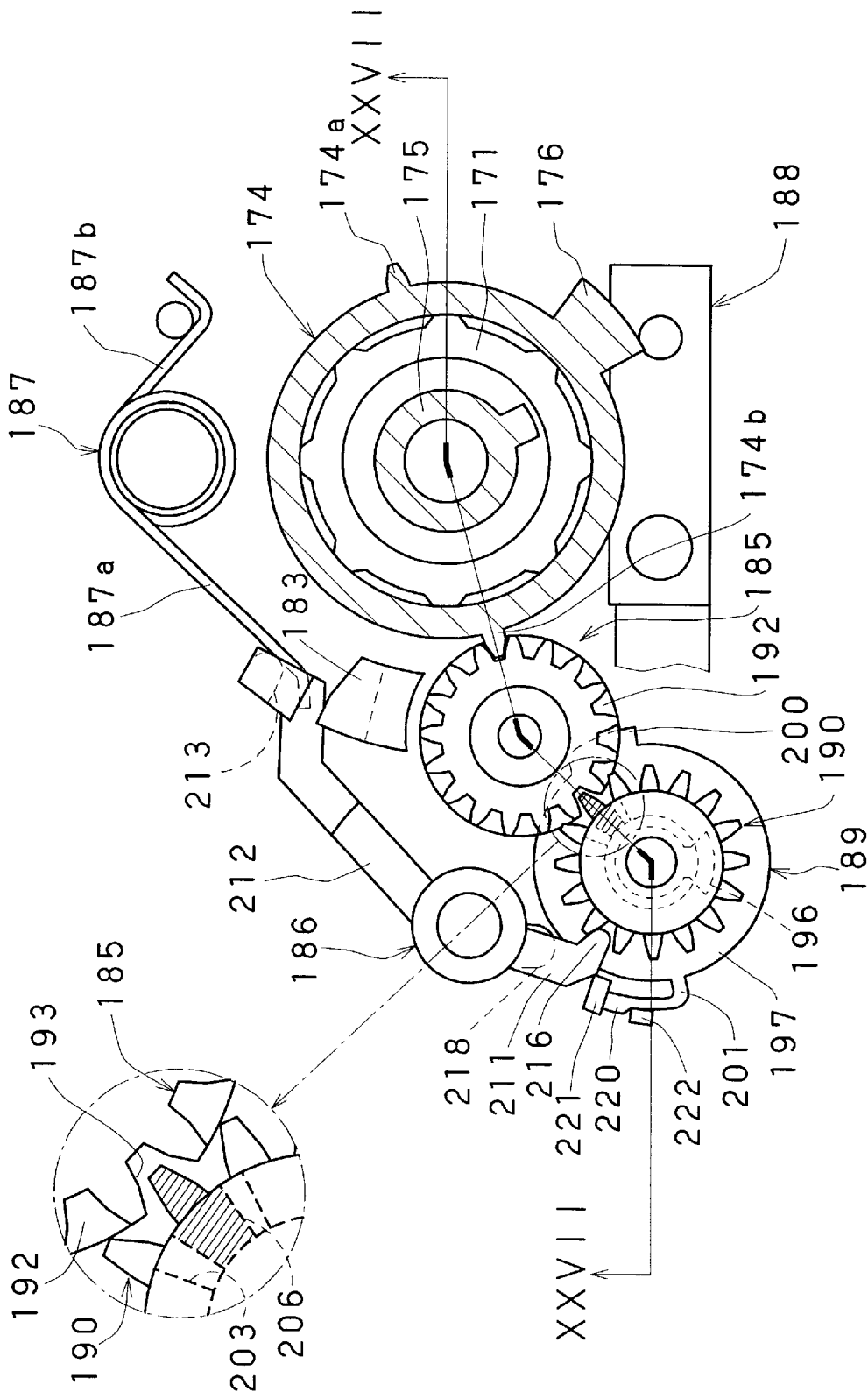

The exposure taking operation and the winding operation are repeated. In FIGS. 24a and 24b, the connecting projection 206 of the intermediate gear 190 is confronted with a cutout 183 of the shutter rotating member 189. In FIG. 25, the connecting projection 206 is pushed to a top face of a cam disk 192 under the counter gear 185, and kept from moving downwards even with bias of the plate spring 188 thereto.

After a final frame is exposed, the winder wheel 10 is rotated. Perforations of the photo film 12 are disengaged from teeth of a sprocket wheel. A cam of a counter plate comes in contact with a rise projection of a retainer lever. See FIG. 3. The counter plate and thus a cam member stop rotating. The retainer lever does not come to the blocking position, so that the winder wheel 10 becomes rotationally free.

The user rotates the winder wheel 10 in accordance with the guidance information printed on the packaging bag or the outer sheet member. When the winder wheel 10 makes a predetermined number of rotations, the photo film 12 is entirely wound into the cassette shell 13.

Figure 27:
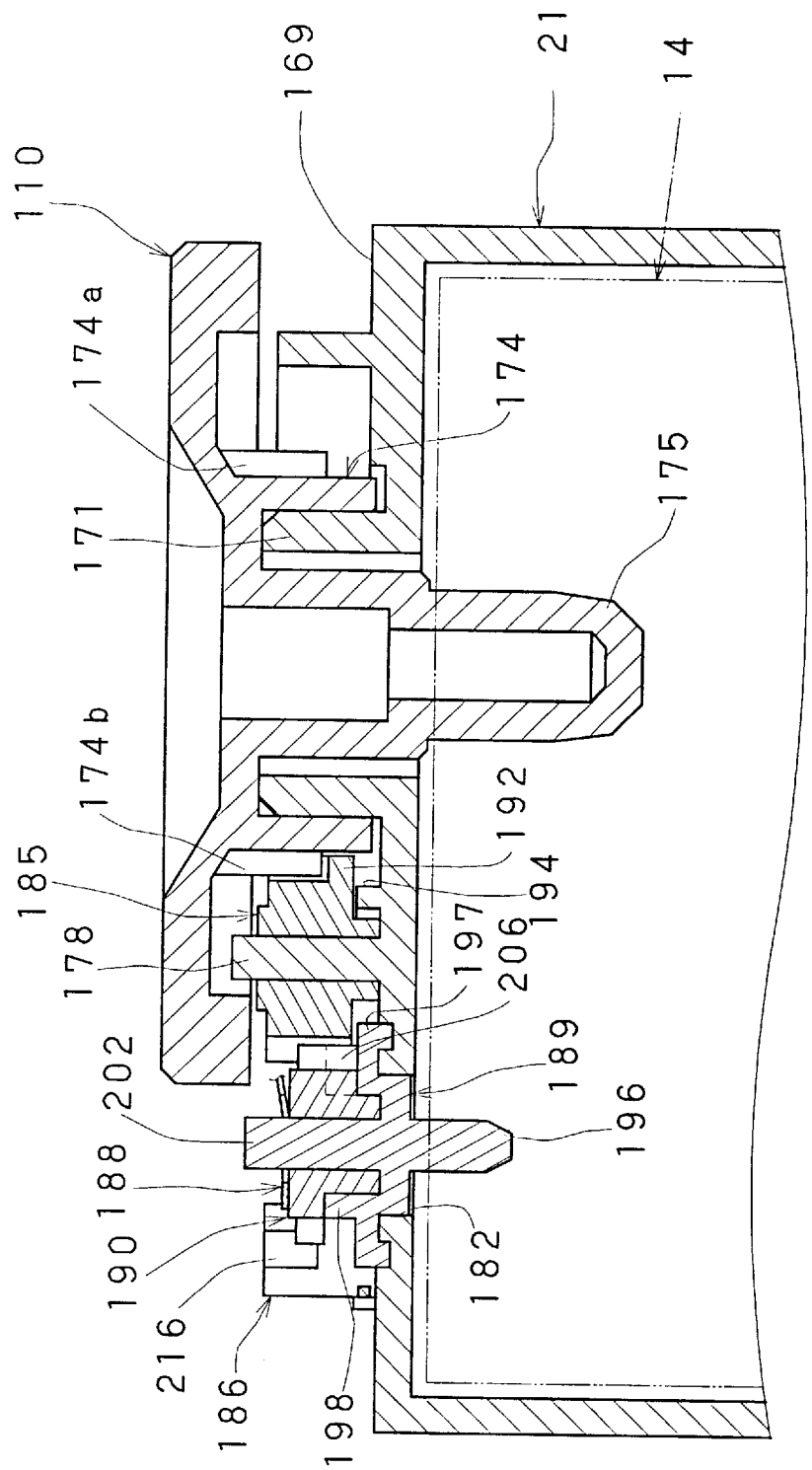
FIG. 27 is a section taken on line XXVII—XXVII in FIG. 26, illustrating the transmission mechanism.

Upon a photo film winding operation after the exposures, a guide groove 193 in the cam disk 192 comes to a position in mesh with the intermediate gear 190. See FIGS. 26a and 26b. In the course of the manufacture of the lens-fitted photo film unit, the intermediate gear 190 is so preset that, when the winder wheel 10 makes a predetermined number of the rotations, the connecting projection 206 comes confronted with the guide groove 193 in the cam disk 192. Accordingly the guide groove 193 moved to the intermediate gear 190 becomes reliably confronted with the connecting projection 206. The connecting projection 206 is also positioned with an engaging cutout 203 formed in the shutter rotating member 189. In FIG. 27 taken on line XXVII—XXVII, the intermediate gear 190 is moved downwards by the bias of the plate spring 188.

The intermediate gear 190, even when moved axially, is still in mesh with the counter gear 185. The user does not notice the axial movement of the intermediate gear 190, but continues rotating the winder wheel 10 by following the information on the packaging bag or the outer sheet member. The counter gear 185 and the intermediate gear 190 are caused by the winder wheel 10 to rotate. The engaging cutout 203 of the shutter rotating member 189 has a width greater than the connecting projection 206, so that there is a short range where rotation of the intermediate gear 190 is not transmitted to the shutter rotating member 189. The intermediate gear 190 is rotated until the connecting projection 206 contacts the inside of the engaging cutout 203. Then rotation of the intermediate gear 190 is transmitted to the shutter rotating member 189.

Figure 28:
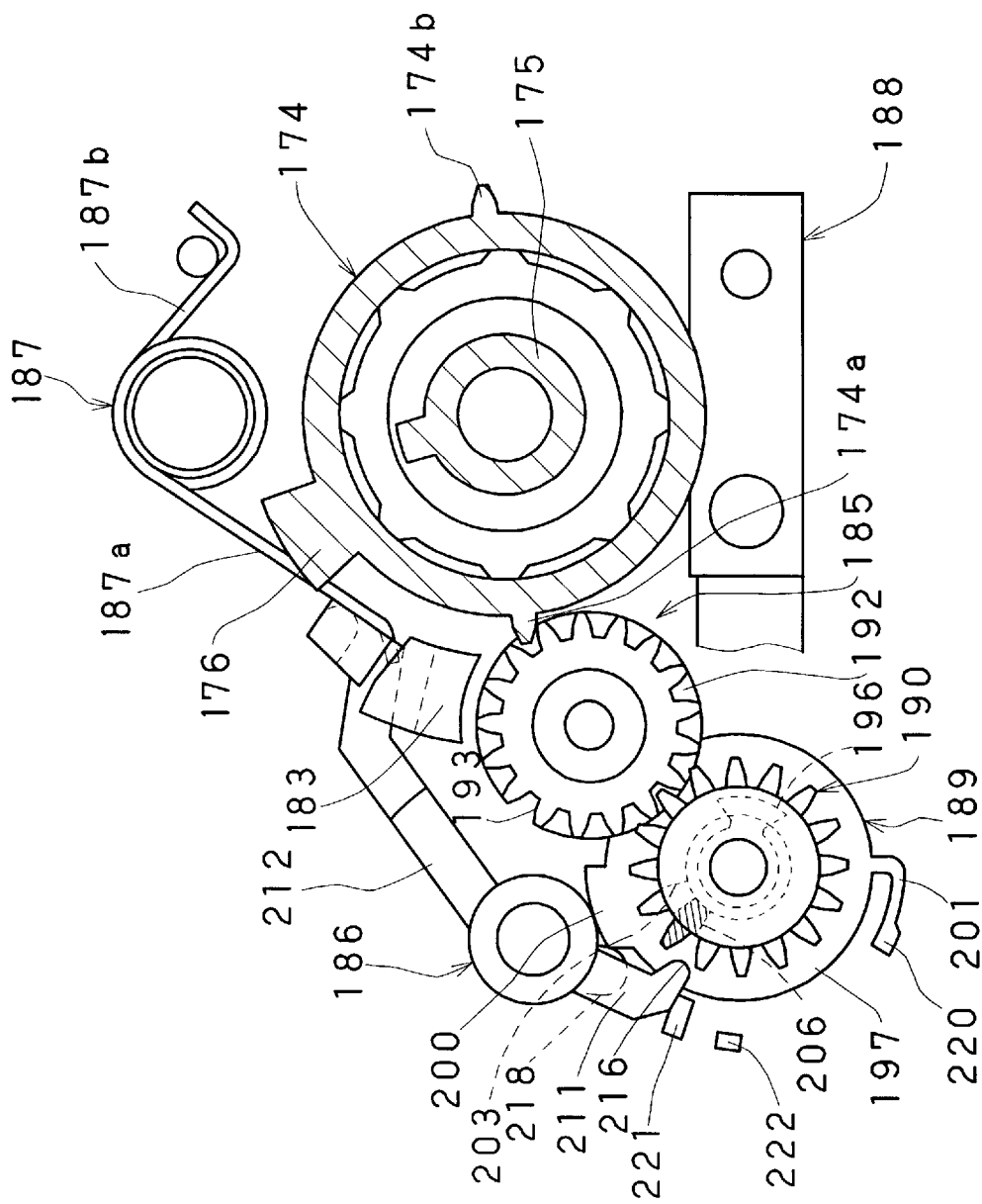
FIG. 28 is a plan, partially in section, illustrating a state where the wheel lock mechanism starts operating.

When rotation of the intermediate gear 190 is transmitted to the shutter rotating member 189, the positioning member 201 is deformed and shifted away from the projections 221 and 222 as shown in FIG. 28. The shutter rotating member 189 is allowed to rotate counterclockwise together with the intermediate gear 190.

When the shutter rotating member 189 rotates in the counterclockwise direction, a push projection 200 on the periphery of a cam portion 197 of the shutter rotating member 189 pushes a push receiving projection 218 of the lock lever 186. The lock lever 186 is rotated in the clockwise direction against the bias of the torsion coil spring 187.

Figure 29:
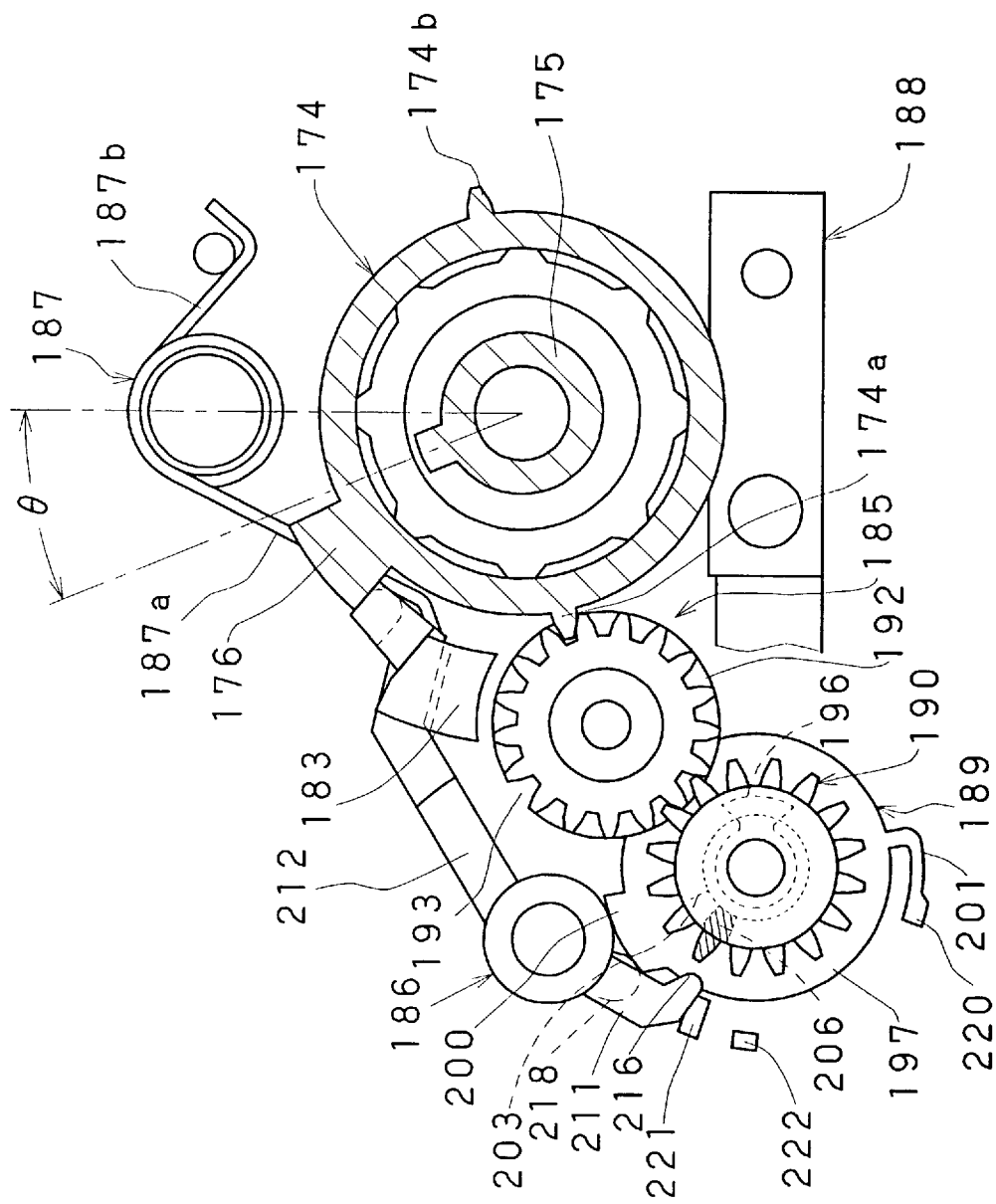
FIG. 29 is a plan, partially in section, illustrating a state where the wheel lock mechanism locks the winder wheel.

When the shutter rotating member 189 is rotated to a closed position of the cassette shutter 153, a second arm portion 212 of the lock lever 186 comes closer to the two-toothed gear 174 as depicted in FIG. 29, and squeezed between the cutout 183 and a lock projection 176. Thus the winder wheel 10 is rotationally locked. The user touching the winder wheel 10 is caused to recognize the state of the finish of entirely winding the photo film. The winder wheel 10 being locked keeps a spool 151 at the angle θ. The photo film cassette 14 being removed has an indicator plate positioned behind an indicator opening indicating the "Exposed" status. See FIG. 5.

The lens-fitted photo film unit being used is forwarded to a photo laboratory. A photofinishing operator applies rotational force with his or her finger to the winder wheel 10, to confirm the finish of the entire winding of the photo film 12. After the confirmation, the lens-fitted photo film unit is transferred and handled in a process of removing the photo film cassette 14. If the finish is not confirmed, then the winder wheel 10 is rotated so much that the winder wheel 10 becomes locked. Then the lens-fitted photo film unit is handled in the removing process for the photo film cassette 14.

In the removing process, the cassette shutter 153 of the photo film cassette 14 of the lens-fitted photo film unit is tightly closed. The lens-fitted photo film unit is treated safely in an illuminated room. To remove the photo film cassette 14, a bottom lid is opened before the photo film cassette 14 is moved in its axial direction out of the cassette containing chamber 21.

The photo film cassette 14 of which the cassette shutter 153 is closed can be removed from the lens-fitted photo film unit in an illuminated room. After removal of the photo film cassette 14, the spool 151 is rotationally latched, as the cassette shutter 153 pushes a latch lever to keep it in mesh with a latch gear of a latch member. The indicia of the "Exposed" status is unfailingly shown. Users are prevented from loading cameras erroneously with the photo film cassette 14 of this status.

Afterwards the photo film 12 is drawn and unwound from the photo film cassette 14, and subjected to processes of development and printing. The photo film 12 being developed is rewound into the cassette shell 13 being identical. The indicator plate of the cassette shell 13 is controlled to stop behind an indicator opening to indicate the "Developed" status, before the cassette shell 13 and photographic prints are forwarded to the user.

EXAMPLE

In the lens-fitted photo film unit of the present embodiment, the predetermined number of rotations of the winder wheel 10 associated with a different length of the photo film 12 can be changed by changing an initial mounting positions of the counter gear 185 and the intermediate gear 190. If the photo film 12 is a type for 25 exposures for example, the counter gear 185 is so mounted that the guide groove 193 of the cam disk 192 is away from a position of the mesh with the intermediate gear 190 by six (6) teeth in the counterclockwise direction. The intermediate gear 190 is so mounted that the connecting projection 206 is away by 12 teeth in the clockwise direction.

If the photo film 12 is a type for 40 exposures for example, the counter gear 185 is so mounted that the guide groove 193 of the cam disk 192 is away from a position of the mesh with the intermediate gear 190 by 15 teeth in the counterclockwise direction. The intermediate gear 190 is so mounted that the connecting projection 206 is away by 10 teeth in the clockwise direction.

Note that, in the present example, the positioning of the counter gear 185 and the intermediate gear 190 becomes finely changeable in a small range depending upon a range between the state of the finish of entirely winding the photo film 12 into the cassette shell 13 and the state of rotating the cassette shutter 153 to the closed position. The numbers of teeth of the counter gear 185 and the intermediate gear 190 are not limited to those according to this example. The positions for mounting the counter gear 185 and the intermediate gear 190 change according to changes of their tooth numbers.

In the above embodiment, the finish of entirely winding the photo film 12 can be recognized by checking a locked state of the winder wheel 10. Alternatively it is possible to dispose an indicia or mark on a surface of any of the counter gear 185, the intermediate gear 190, the shutter rotating member 189 and the lock lever 186, and to shift the indicia to an opening in an externally observable manner when the photo film 12 is finally wound into the cassette shell.

In the above embodiment, the intermediate gear 190 and the shutter rotating member 189 are supported coaxially. However the shutter rotating member 189 may be rotatable about on an axis different from that of the intermediate gear 190. In the above embodiment, the lock lever 186 for locking the winder wheel 10 is engaged with the lock projection 176 on the two-toothed gear 174. Alternatively a recess or cutout may be formed in the two-toothed gear 174, and may be engaged with the lock lever 186.

In the above embodiments, the lens-fitted photo film units is pre-loaded with a photo film cassette of the IX240 type of which rotation of the spool causes a leader of the photo film to advance to the outside. Alternatively a photo film cassette of 135 type may used in the present invention.

Referring now to FIGS. 30–35, another preferred embodiment is described, in which a shutter rotating member is prevented from inseparably sticking on a timing lever. In a process of assembling parts of a lens-fitted photo film unit 302 of FIGS. 30 and 31, a dark room is required for loading the lens-fitted photo film unit 302 with a photo film cassette 318. A photo film 316 being unexposed is pulled from a cassette shell 317 to form a photo film roll. The cassette shell 317 is inserted into a cassette containing chamber 326 while moved in an axial direction. The photo film roll is inserted into a photo film roll chamber 327 through its rear gap. An amount at which the photo film 316 is drawn from the cassette shell 317 is precisely controlled. The photo film 316 is drawn in such a manner from the cassette shell 317 that a virtual frame position prior to a first available frame position by one frame length is set on an exposure opening 325a. The drawing amount being so controlled in the factory, it is possible precisely to regularize the predetermined number of rotations to be made by a winder wheel 313 to finish winding the entirety of the photo film 316 into the cassette shell 317.

The lens-fitted photo film unit 302, of which various parts are assembled and the photo film cassette 318 is loaded, is inspected for various respects of performance, and packaged before the lens-fitted photo film unit 302 is shipped out. There is guidance information printed on a packaging bag or an outer sheet member of the lens-fitted photo film unit 302, for the purpose of having a user continue rotating the winder wheel 313 after all frames are exposed until the winder wheel 313 is locked.

Figure 33:
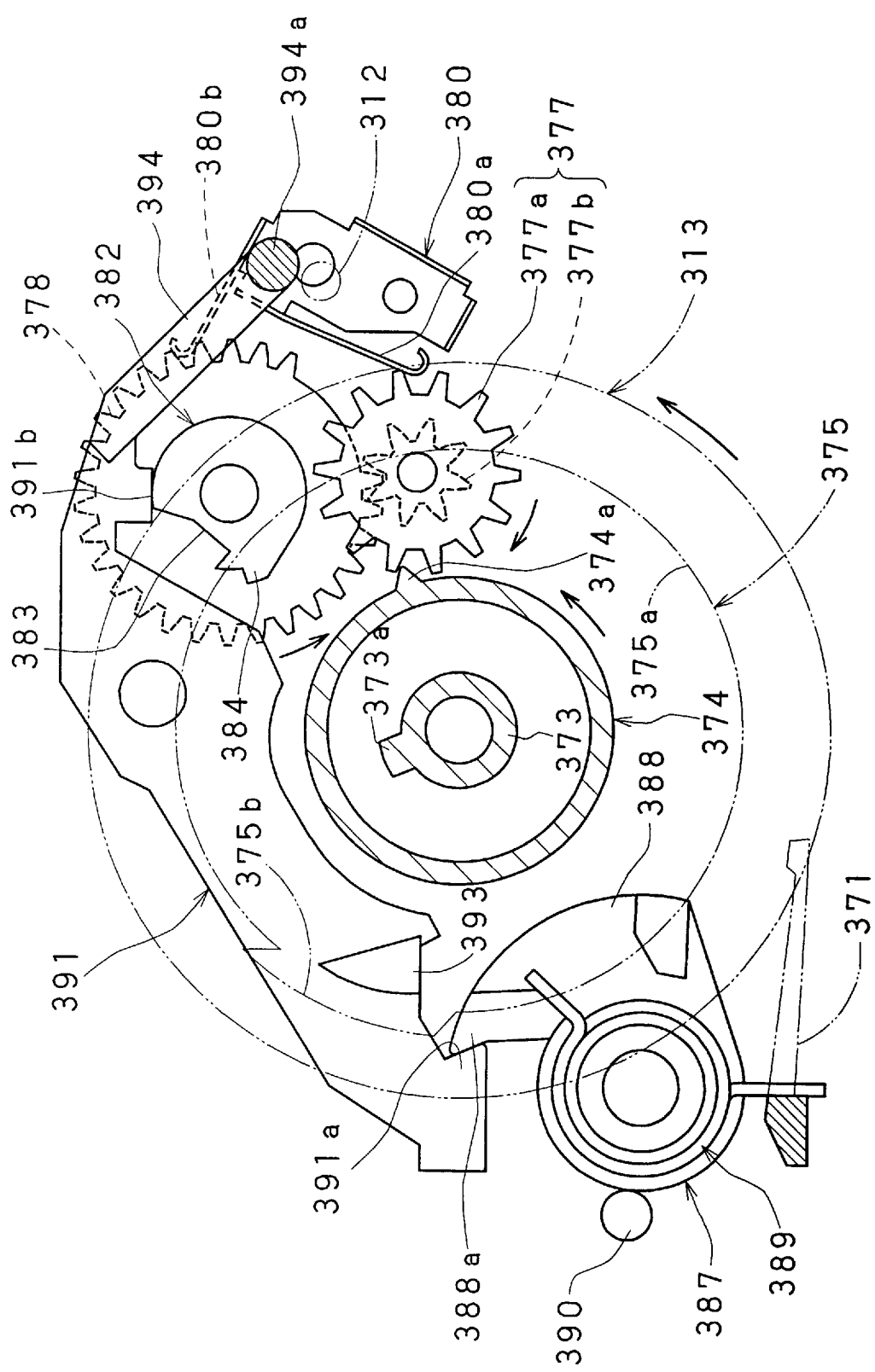
FIG. 33 is a plan, partially in section, illustrating a state before the shutter rotating member operates.

In FIG. 33, a shutter rotating mechanism of the lens-fitted photo film unit 302 being unused includes a timing lever 391, of which a detecting protruded end 391b contacts a peripheral face 382a of a cam disk 382. In a shutter rotating member 387, an engaging claw 388a is engaged with a hook-shaped engaging protruded end 391a of the timing lever 391. The shutter rotating member 387 is kept in the open position of a cassette shutter 329 against the bias of a spring 389. An indicator portion 394a of an indicator arm 394 of the timing lever 391 is away from an opening 312, and not observable through the opening 312.

Before the lens-fitted photo film unit 302 is used, its shutter mechanism is not yet charged. The winder wheel 313 is not locked. To take a first exposure, the winder wheel 313 is rotated to charge the shutter mechanism. The rotation of the winder wheel 313 causes a drive shaft 373 to rotate a spool 328 in the cassette shell 317. The photo film 316 is wound about the spool 328 so that the photo film 316 is wound into the cassette shell 317. With the photo film 316 moved, the shutter mechanism within an exposure unit 320 is charged. Then the winder wheel 313 is locked by a wind blocking mechanism for the photo film.

When the winder wheel 313 is rotated, one tooth 374a of a one-toothed gear 374 or intermittent gear rotated together causes an upper gear 377a of a speed reduction gear 377 to rotate by a regular angle. A lower gear 377b rotates with the upper gear 377a, to cause a counter gear 378 to rotate in turn. The cam disk 382 rotates together with the counter gear 378 while the detecting protruded end 391b of the timing lever 391 pushes the peripheral face 382a.

After charging the shutter, a user observes a field of view through a viewfinder window 314 of the viewfinder to target a photographic subject. If a use of flash is desired, a charger pushbutton 306 is slid upwards to charge a flash device. If a different size of a photograph is desired, a slider 307 is slid to change over a finder frame in which the field is viewed through the viewfinder. Also an imprinting device for imprinting indicia on the photo film 316 is changed over. When the standby operation is finished, a shutter release button 308 is depressed to release the shutter mechanism of the exposure unit 320. The photo film 316 is exposed through a taking lens 303 and the exposure opening 325a. At the same time the indicia of information of a printing range is imprinted to a portion of the photo film 316 outside an effective region of a frame.

After all the available frames of the photo film 316 are exposed, a wind blocking mechanism of the exposure unit 320 does not operate. A user rotates the winder wheel 313 by following the guidance information until the winder wheel 313 is locked. A cutout 383 formed in the peripheral face 382a of the cam disk 382 comes confronted with the detecting protruded end 391b of the timing lever 391 upon finish of the predetermined number of rotations of the winder wheel 313 to wind the entirety of the photo film 316 into the cassette shell 317.

When the cutout 383 is confronted with the detecting protruded end 391b, the timing lever 391 is pushed by the shutter rotating member 387 biased by the spring 389, and is swung in a clockwise direction in which the detecting protruded end 391b is directed into the cutout 383. A lock projection 393 of the timing lever 391 contacts an inner face 375a of a cam ridge 375. Then the winder wheel 313 rotates further. During one or less rotation made by the winder wheel 313, a lock cutout 375b of the cam ridge 375 is confronted with the lock projection 393. The bias of the spring 389 engages the detecting protruded end 391b with the cutout 383 of the cam disk 382, and the lock projection 393 with the lock cutout 375b.

Figure 34:
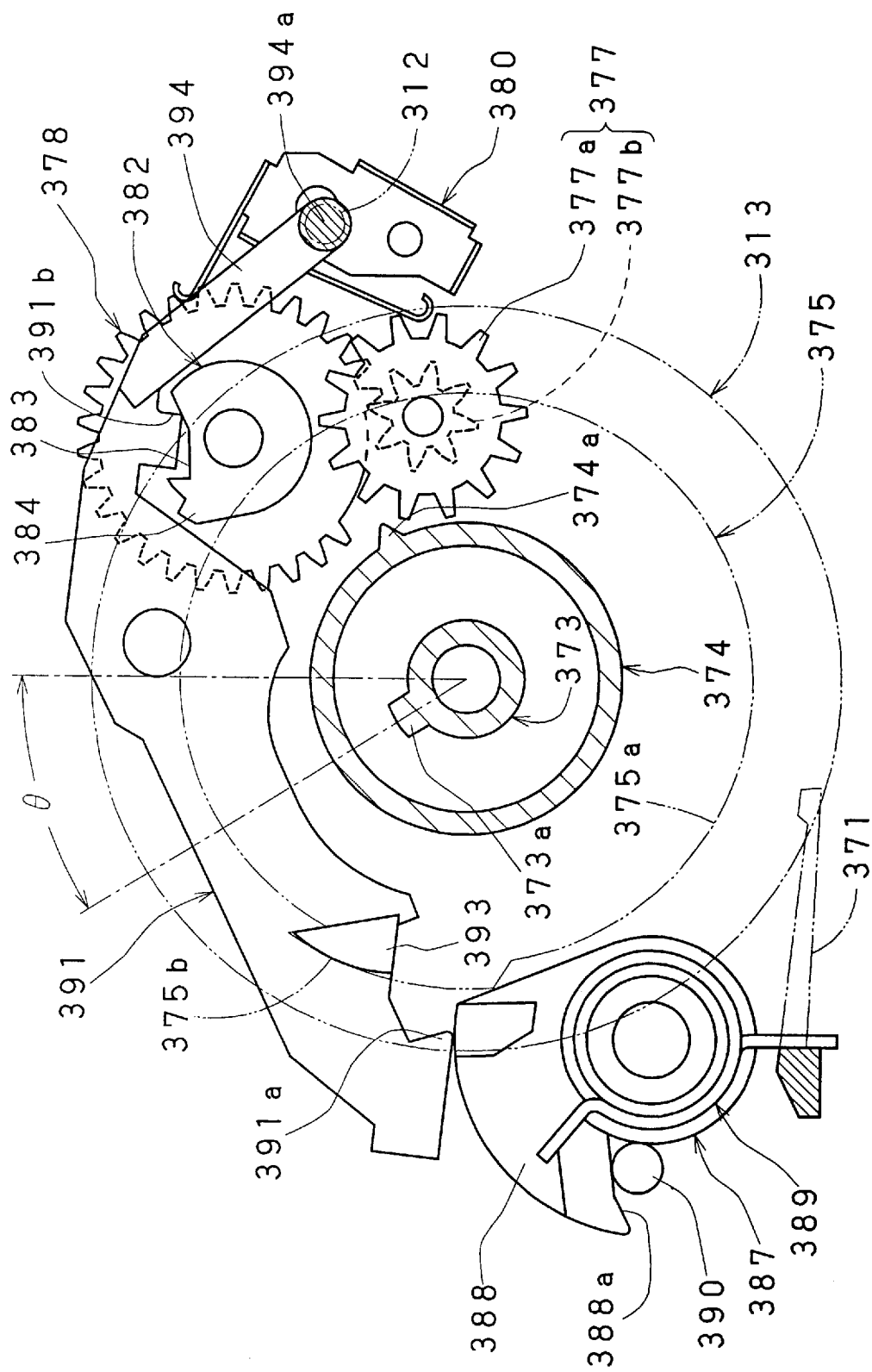
FIG. 34 is a plan, partially in section, illustrating a state of the shutter rotating member upon a finish of winding the photo film.

The winder wheel 313 is rotated further. In FIG. 34, the lock projection 393 becomes engaged with the lock cutout 375b, to block rotation of the winder wheel 313. While the winder wheel 313 is locked by the timing lever 391, a key 373a of the drive shaft 373 of the winder wheel 313 is directed at the angle θ with reference to line L. In the manner of FIG. 5, an indicator plate of the cassette shell 317 is stopped behind an indicator opening representing an "Exposed" status. Thus users are prevented from loading cameras erroneously with the photo film cassette 318 of this status.

Note that, after the lock projection 393 of the timing lever 391 comes in contact with the inner face 375a of the cam ridge 375, the winder wheel 313 is rotated. When the winder wheel 313 makes the predetermined number of rotations, a toothless portion of the counter gear 378 comes confronted with the lower gear 377b of the speed reduction gear 377. Thus the counter gear 378 does not rotate even if the winder wheel 313 rotates.

When the timing lever 391 is swung, the shutter rotating member 387 is released from retention in the open position of the cassette shutter 329. The bias of the spring 389 rotates the shutter rotating member 387 counterclockwise toward the closed position of the cassette shutter 329. The cassette shutter 329 is closed through engagement with an engaging shaft 387a of the shutter rotating member 387. The shutter rotating member 387 in the closed position is kept from rotating as a stopper plate 388 contacts a stopper pin 390. There does not occur a damage of the cassette shutter 329 even with the bias of the spring 389. After closing of the cassette shutter 329, the peripheral face of the stopper plate 388 contacts the engaging protruded end 391a of the timing lever 391 to avoid swinging the timing lever 391 improperly.

When the timing lever 391 swings, the indicator portion 394a of the indicator arm 394 moves to a position under the opening 312. It is possible for the user to confirm the finish of winding the photo film and closing the cassette shutter 329 by observing the opening 312 outside the lens-fitted photo film unit 302.

The lens-fitted photo film unit 302 being used is forwarded to a photo laboratory. The opening 312 is observed by a photofinishing operator, to confirm the finish of the entire winding of the photo film 316. After the confirmation, the lens-fitted photo film unit 302 is transferred and handled in a process of removing the photo film cassette 318. If the finish is not confirmed, then the winder wheel 313 is rotated so much that the winder wheel 313 becomes locked. Then the lens-fitted photo film unit 302 is handled in the removing process for the photo film cassette 318.

In the removing process, a bottom lid 346 of the lens-fitted photo film unit 302 is opened to remove the photo film cassette 318. The photo film cassette 318 of which the cassette shutter 329 is closed can be removed in an illuminated room from the lens-fitted photo film unit 302. This removal is advantageous, as no dark room is required. In the photo film cassette 318, the spool 328 is latched by a latch lever pushed by the cassette shutter 329 in the closed position. The indicator plate of the photo film cassette 318 is positioned behind the indicator opening indicating the "Exposed" status.

Afterwards the photo film 316 is drawn and unwound from the photo film cassette 318, and subjected to the process of development. The photo film 316 is then subjected to a process of producing photographic prints in accordance with indicia imprinted by the imprinting device for imprinting indicia on the photo film 316. The photo film 316 being developed is rewound into the cassette shell 317 being identical. The indicator plate of the cassette shell 317 is controlled to stop behind an indicator opening to indicate the "Developed" status, before the cassette shell 317 and photographic prints are forwarded to the user.

Figure 35:
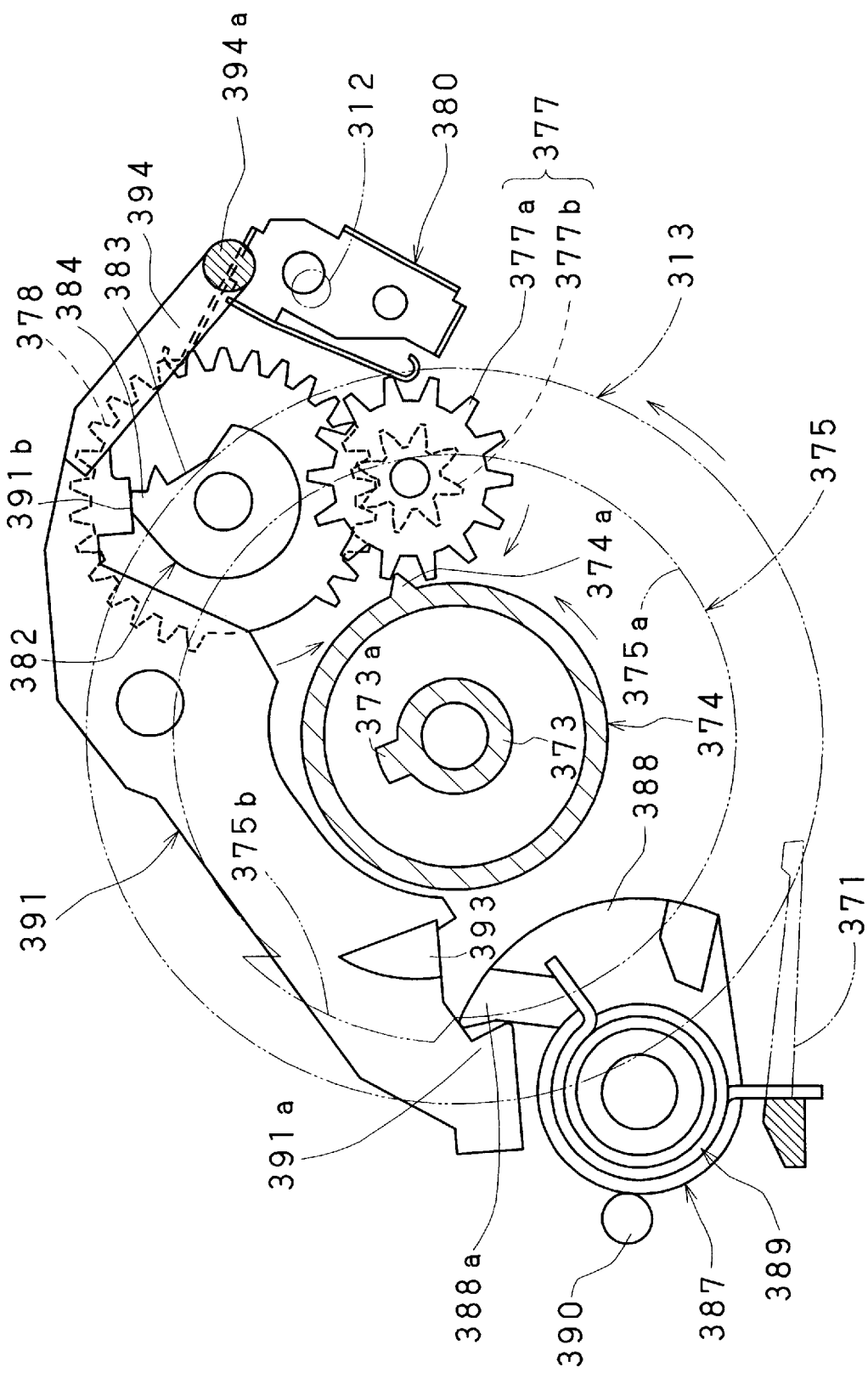
FIG. 35 is a plan, partially in section, illustrating a state of a small swing of a lever for breaking fixedness, shortly before the finish of the winding.

Due to an individual environment of the lens-fitted photo film unit 302, it is likely that a considerably long term is taken after the manufacture of the lens-fitted photo film unit 302 until the finish of using the photo film 316. The engaging protruded end 391a of the timing lever 391 is likely to be stuck on the engaging claw 388a of the shutter rotating member 387 for the reasons of strong force of the bias of the spring 389 and environmental factors including heat and vibration. However the cam disk 382 has a pre-shifter projection 384 located in an upstream position from the cutout 383. In FIG. 35, the pre-shifter projection 384 contacts the detecting protruded end 391b to swing the timing lever 391 before the cutout 383 comes confronted with the detecting protruded end 391b of the timing lever 391. Thus it is possible to destroy the fixedness between the engaging protruded end 391a of the timing lever 391 and the engaging claw 388a of the shutter rotating member 387. When the cutout 383 is confronted with the detecting protruded end 391b, the cassette shutter 329 is closed properly.

In the above embodiment, the timing lever 391 is swung shortly before the finish of entirely winding the photo film 316. Alternatively a projection may be formed on the winder wheel 313 or the one-toothed gear 374 for swinging the timing lever 391 slightly, so as to swing the timing lever 391 each time of rotating the winder wheel 313. It is possible to avoid inseparable fixedness.

In the above embodiment, the winder wheel 313 is locked at the time of the cassette shutter 329 is closed. However the lock mechanism for the cassette shutter 329 may be omitted. In the above embodiment, the timing lever 391 is swung by the biasing force of the spring for the shutter rotating member 387. Alternatively a spring may bias the timing lever 391, of which a swing rotates the shutter rotating member 387 to the closed position of the cassette shutter 329.

In the above embodiment, the indicator opening and the indicator portion 394a of the timing lever 391 is used to display the finish of entirely winding the photo film 316 and the closing of the cassette shutter 329. Alternatively the indicator arm 394 may be protruded from, or retracted into, the lens-fitted photo film unit 302 in response to the rotation of the shutter rotating member 387 to the closed position. Also an indicia may be formed on the top of the counter gear 378, and may be shifted in an observable manner through an opening. Also those visible indication may be omitted. The information of the finish may be provided for a user only through the locked state of the winder wheel 313.

In the above embodiments, the speed reduction gear 377 is used between the one-toothed gear 374 and the counter gear 378. However it is possible to omit the speed reduction gear 377, typically if the photo film has a length entirely windable in a range of all the teeth of the counter gear 378. If the inside of the lens-fitted photo film unit 302 has a space for incorporating the counter gear 378 with a sufficient number of teeth, the lens-fitted photo film unit 302 may lack the speed reduction gear 377.

In the above embodiment, the finish detector or intermittent transmission unit operates by counting rotations of the winder wheel 313 for entirely winding the photo film 316 into the cassette shell 317. Alternatively a disclosure of JP-A 8-211565 may be used. According to this, presence of the photo film 316 is directed in a position near to a photo film passageway of the photo film cassette 318.

If the timing lever 391 cannot be swung in the finish detector of the type of direct detection of presence of the photo film 316 outside the cassette shell 317, the timing lever 391 may not be swung. The timing lever 391 can be formed of resin different from resin of which the shutter rotating member 387 can be formed. Examples of plural resins are polyacetal (POM) and polystyrene (PS). It is likely that there does not occur inseparable fixedness between different resins. It is possible to close the cassette shutter 329 reliably without a preliminary swing of the timing lever 391.

Figure 30:
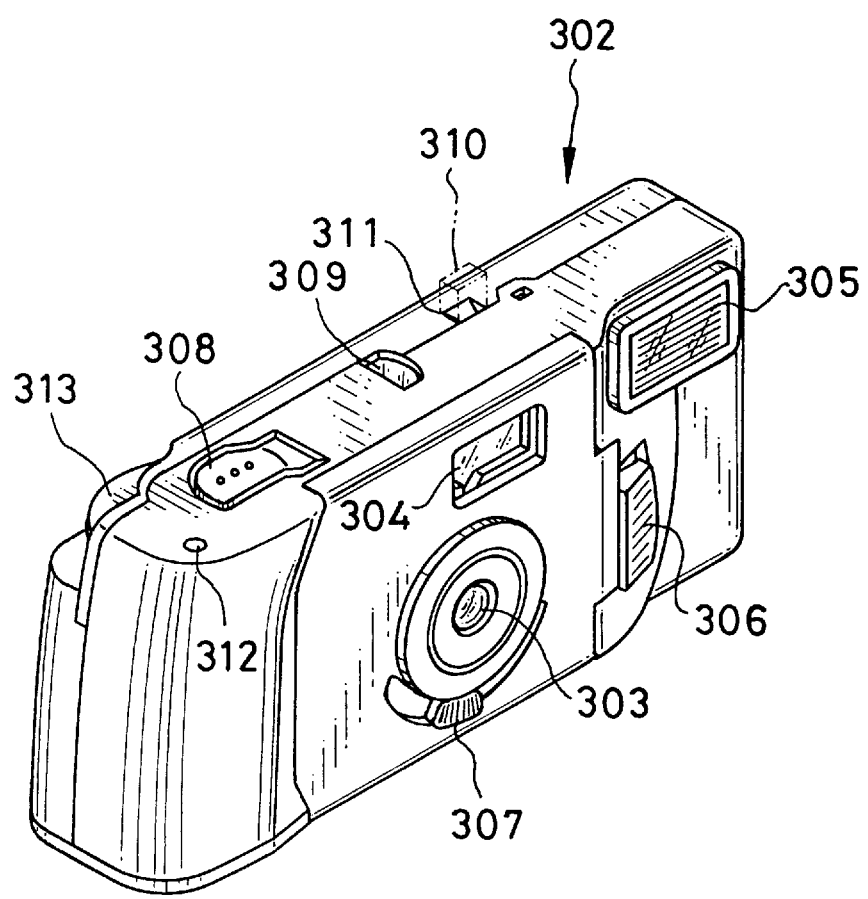
FIG. 30 is a perspective illustrating another lens-fitted photo film unit.

Note that a reference numeral 310 in FIG. 30 designates an indicator or light guide for indicating a state of the finish of charging the flash device. The light guide 310 is protruded through an opening 311.

Figure 31:
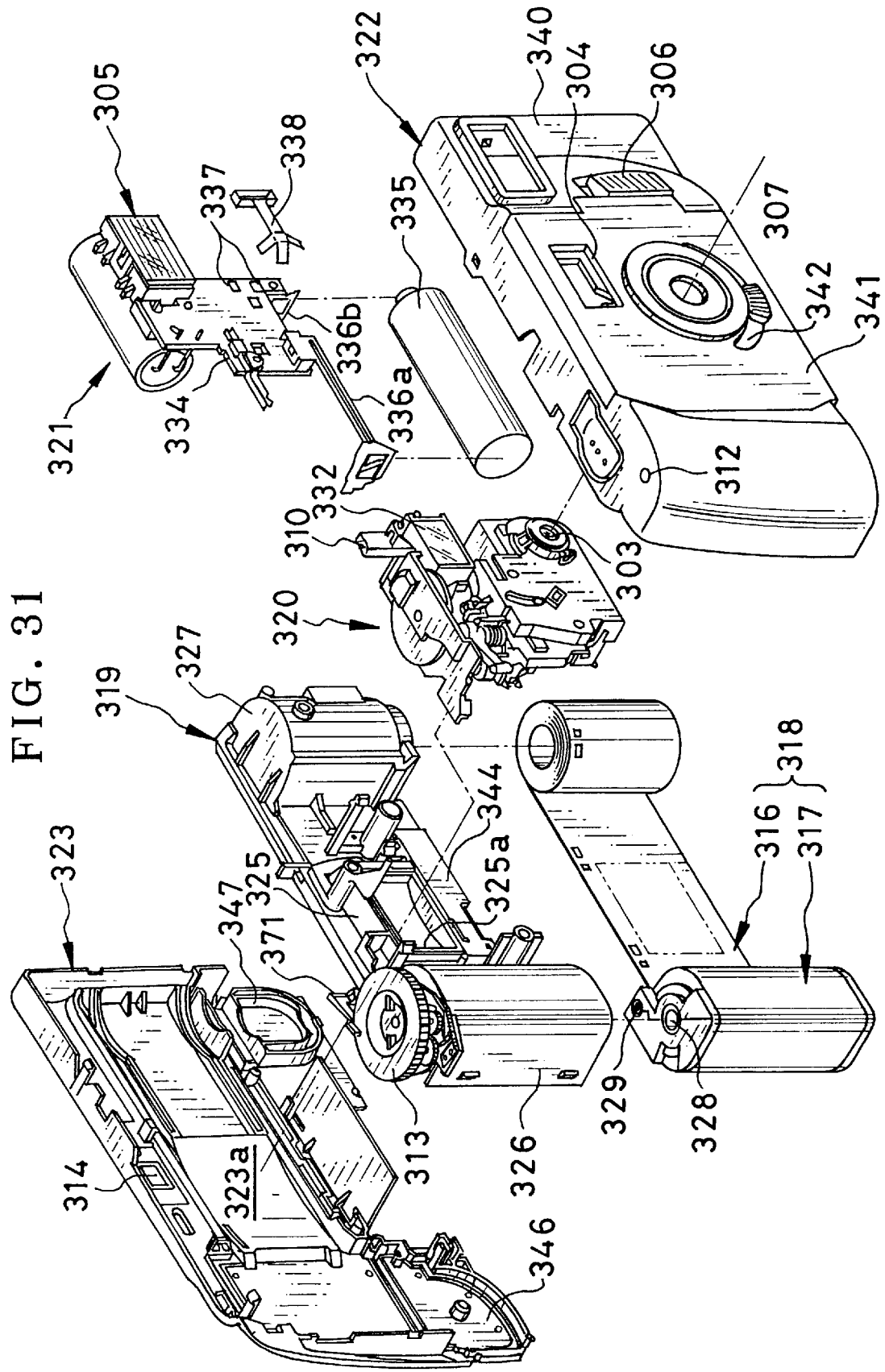
FIG. 31 is an exploded perspective illustrating the lens-fitted photo film unit.
Figure 32:
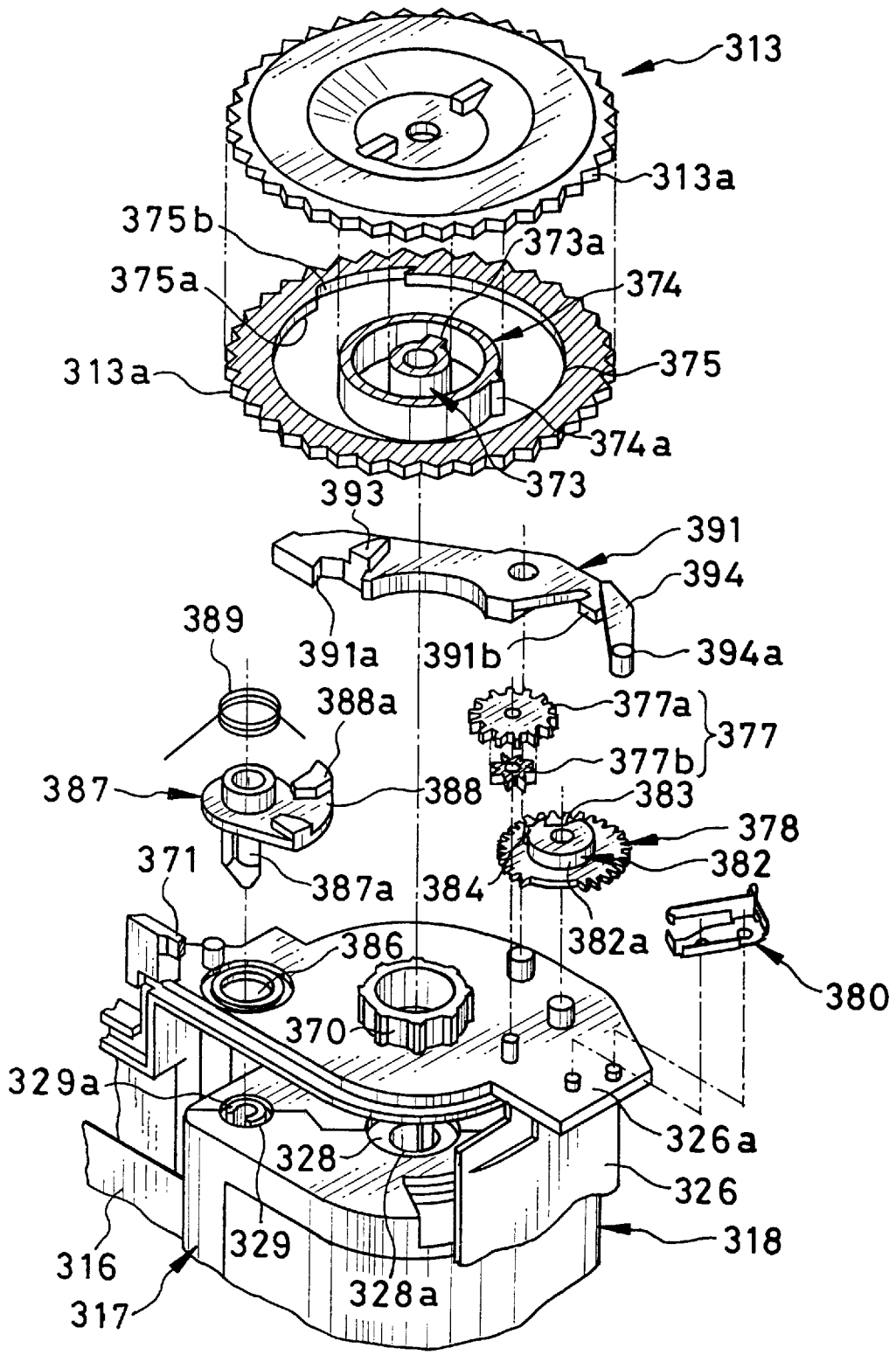
FIG. 32 is an exploded perspective illustrating a structure, including a shutter rotating member, for closing the cassette shutter.

In FIG. 31, a front cover 322 is constituted by a front cover frame 340 and a front cover panel 341 fitted on the center of the front cover frame 340. The front cover frame 340 includes the shutter release button 308 and the opening 312 formed integrally therewith. A view field selector plate (not shown) is incorporated between the front cover frame 340 and the front cover panel 341. Also the charger pushbutton 306 is disposed on the front cover frame 340. The view field selector plate is rotatable about a photographic optical axis between the front cover frame 340 and the front cover panel 341, and is rotated by operation of the slider 307, which is movable inside an arc-shaped slot 342 formed in the front cover panel 341. The view field selector plate has a plurality of finder frames movable into and away from a position between a finder objective window 304 and a viewfinder lens 332 of the exposure unit 320. Those finder frames limit a range inside the viewfinder to respective ranges of the panorama, high-vision, and standard.

The view field selector plate also changes over an imprinting device 344 for imprinting a dot indicia to the photo film 316 by way of information of a printing size. The imprinting device 344 is incorporated under a light-shielding tunnel 325 of a photo film containing unit 319. Its detailed structure is omitted from the drawings. The imprinting device 344 is constituted by two imprinting openings, an indicia selector plate segment, an imprinting light guide, a light-shielding cover, and a rotating lever and a sliding lever. Each of the two imprinting openings is confronted with a portion of the photo film 316 outside its effective frame region. The indicia selector plate segment opens/closes the imprinting openings in a selective manner. The imprinting light guide guides exposing light toward the imprinting openings via the indicia selector plate segment. The light-shielding cover prevents ambient light from coming incident on those elements. The rotating lever and the sliding lever cooperate to transmit rotation of the view field selector plate to the indicia selector plate segment. To emit the exposing light, there are light-emitting elements secured to a rear surface of a printed circuit board 334 of a flash device 321.

Although the present invention has been fully described by way of the preferred embodiments thereof with reference to the accompanying drawings, various changes and modifications will be apparent to those having skill in this field. Therefore, unless otherwise these changes and modifications depart from the scope of the present invention, they should be construed as included therein.

What is claimed is:

1. A lens-fitted photo film unit, including a photo film housing, a cassette containing chamber and a photo film roll chamber formed in said photo film housing, a cassette being contained in said cassette containing chamber, a photo film of a predetermined length being contained in said photo film roll chamber in a roll form, said cassette having a cassette shell and a spool contained in said cassette shell in a rotatable manner, said photo film being secured to said spool, said lens-fitted photo film unit comprising:

a winder wheel, connected to said spool, capable of being operated externally of said photo film housing each time after one frame is exposed on said photo film, to wind an exposed portion of said photo film into said cassette about said spool;

a position detector for detecting that said winder wheel has made a predetermined number of rotations, said predetermined number depending upon said predetermined length of said photo film; and a lock mechanism for locking rotation of said winder wheel in response to rotation of said winder wheel to a predetermined rotational position after said predetermined number of said rotations of said winder wheel, said lock mechanism inhibiting said winder wheel from being rotated after said photo film is entirely wound into said cassette wherein said lock mechanism includes:

a ring-shaped contact face disposed in a manner rotatable integrally with said winder wheel;

a first retainer portion disposed on said ring-shaped contact face;

a second retainer portion, disposed to confront with said ring-shaped contact face, and engageable with said first retainer portion; and a bias member for pushing said second retainer portion to said ring-shaped contact face, said first retainer portion being confronted with said second retainer portion when said winder wheel is rotated to said predetermined rotational position, said bias member swinging said second retainer portion to engage said second retainer portion with said first retainer portion, wherein said ring-shaped contact face is disposed on an inside of a ring-shaped cam ridge, said ring-shaped cam ridge being disposed within a periphery of said winder wheel to protrude downward from said winder wheel.

2. A lens-fitted photo film unit as defined in claim 1, wherein said first retainer portion comprises a cutout formed in said ring-shaped contact face, and receives said second retainer portion.

3. A lens-fitted photo film unit as defined in claim 2, further comprising:
   an intermittent gear, disposed in a manner rotatable integrally with said winder wheel, and having at least one tooth, said ring-shaped contact face being formed about said intermittent gear;
   a shutter rotating member, connected to an end of a cassette shutter, for rotating said cassette shutter, said cassette shutter being contained in said cassette shell at a position inside a passageway formed for passage of said photo film, said cassette shutter, when rotated in an open position, opening said passageway, and when rotated in a closed position, closing said passageway;
   a lock member, disposed near to said intermittent gear in a rotatable manner, said second retainer portion being formed on said lock member; and
   a push projection, formed to protrude from said shutter rotating member, for pushing and rotating said lock member when said shutter rotating member is rotated to said closed position of said cassette shutter, to push said second retainer portion on said ring-shaped contact face.

4. A lens-fitted photo film unit including a photo film housing, a cassette containing chamber and photo film roll chamber formed in said photo film housing, a cassette being contained in said cassette containing chamber, a photo film of a predetermined length being contained in said photo film roll chamber in a roll form, said cassette having a cassette shell and a spool contained in said cassette shell in a rotatable manner, said photo film being secured to said spool, said lens-fitted photo film unit comprising:
   a winder wheel, connected to said spool, operated externally of said photo film housing each time after one frame is exposed on said photo film, to wind an exposed portion of said photo film into said cassette about said spool;
   a position detector for detecting that said winder wheel has made a predetermined number of rotations, said Predetermined number depending upon said predetermined length of said photo film; and
   a lock mechanism for locking rotation of said winder wheel in response to rotation of said winder wheel to a predetermined rotational position after said predetermined number of said rotations of said winder wheel, said lock mechanism inhibiting said winder wheel from being rotated after said photo film is entirely wound into said cassette, wherein said cassette shell includes:
   an indicator plate disposed in a manner rotatable integrally with said spool;
   at least two indicator openings, formed to open in a wall covering said indicator plate, arranged in said rotational direction of said indicator plate, for respectively causing said indicator plate to appear externally and partially, respectively to indicate an unexposed status and an exposed status of said photo film, wherein said indicator indicates said exposed status when said spool is stopped in said predetermined rotational position; and
   a cassette shutter for opening/closing a photo film passageway, said passageway being formed in said cassette shell for passage of said photo film.

5. A lens-fitted photo film unit as defined in claim 4, further comprising:
   an intermittent gear, disposed in a manner rotatable integrally with said winder wheel, and having at least one tooth;
   a counter gear, meshed with said intermittent gear, and stepped by a regular angle by rotation of said intermittent gear, said counter gear being adapted to counting said frame created on said photo film;
   said position detector includes:
   a cam disk disposed in a manner rotatable integrally with said counter gear;
   a detector protruded portion, disposed near to said winder wheel in a swingable manner, and confronted with a peripheral face of said cam disk;
   a bias member for pushing said detector protruded portion on said peripheral face of said cam disk; and
   a detector cutout formed in said peripheral face of said cam disk, confronted with said detector protruded portion upon a finish of said predetermined number of said rotations of said winder wheel, said detector protruded portion being swung by said bias member and engaged with said detector cutout, for signaling said finish of said rotations.

6. A lens-fitted photo film unit as defined in claim 5, further comprising a timing lever disposed near to said winder wheel in a swingable manner between first and second positions, said detector protruded portion being formed on said timing lever.

7. A lens-fitted photo film unit as defined in claim 6, wherein said lock mechanism includes:
   a ring-shaped contact face disposed in a manner rotatable integrally with said winder wheel;
   a first retainer portion disposed on said ring-shaped contact face;
   a second retainer portion, disposed to confront with said ring-shaped contact face, and engageable with said first retainer portion; and
   a bias member for pushing said second retainer portion to said ring-shaped contact face, said first retainer portion being confronted with said second retainer portion when said winder wheel is rotated to said predetermined rotational position, said bias member swinging said second retainer portion to engage said second retainer portion with said first retainer portion; and
   wherein said ring-shaped contact face is formed about said intermittent gear, and said second retainer portion is formed on said timing lever.

8. A lens-fitted photo film unit as defined in claim 6, further comprising a shutter rotating member, connected to an end of said cassette shutter, for rotating said cassette shutter, said cassette shutter, when rotated in an open position, opening said passageway, and when rotated in a closed position, closing said passageway;
   wherein said bias member biases said shutter rotating member toward said closed position of said cassette shutter;
   said timing lever further includes an auxiliary protruded end disposed near to said shutter rotating member;
   when said timing lever is in said first position, said detector protruded portion is pushed by said peripheral face of said cam disk, and said auxiliary protruded end is shifted into a rotational path of said shutter rotating member, for keeping said shutter rotating member in said open position of said cassette shutter against said bias member; and
   when said timing lever is in said second position, said detector protruded portion is received in said detector cutout, and said auxiliary protruded end is shifted out of said rotational path of said shutter rotating member, for allowing said bias member to rotate said shutter rotating member to said closed position of said cassette shutter.

9. A lens-fitted photo film unit as defined in claim 8, further comprising:

an access opening, formed in a bottom wall of said housing covering said cassette shell, and adapted to external operation therethrough for removal of said cassette shell; and a connection/lid member, disposed to extend between said shutter rotating member and said access opening, for closing said access opening while said cassette shutter is in said open position, said connection/lid member allowing said access opening to open in response to rotation of said cassette shutter to said closed position by use of said shutter rotating member.

10. A lens-fitted photo film unit as defined in claim 9, wherein said connection/lid member is slidable upwards and downwards, and has a top end and a bottom end, said top end contacting said shutter rotating member;

said connection/lid member further including a bottom block plate formed on said bottom end, for closing said closing said access opening;

further comprising a slide spring for biasing said connection/lid member upwards, said slide spring pushing said top end on said shutter rotating member when said shutter rotating member is in said open position of said cassette shutter, and said slide spring sliding said connection/lid member upwards when said shutter rotating member is rotated to said closed position of said cassette shutter.

11. A lens-fitted photo film unit as defined in claim 4, wherein said lock mechanism includes:

a ring-shaped contact face disposed in a manner rotatable integrally with said winder wheel;

a first retainer portion disposed on said ring-shaped contact face;

a second retainer portion, disposed to confront with said ring-shaped contact face, and engageable with said first retainer portion; and a bias member for pushing said second retainer portion to said ring-shaped contact face, said first retainer portion being confronted with said second retainer portion when said winder wheel is rotated to said predetermined rotational position, said bias member swinging said second retainer portion to engage said second retainer portion with said first retainer portion;

wherein said ring-shaped contact face is disposed on an inside of a ring-shaped cam ridge, said ring-shaped cam ridge being disposed within with a periphery of said winder wheel to protrude downward from said winder wheel;

further comprising a shutter rotating member, connected to an end of a cassette shutter, for rotating said cassette shutter, said cassette shutter being contained in said cassette shell at a position inside a passageway formed for passage of said photo film, said cassette shutter, when rotated in an open position, opening said passageway, and when rotated in a closed position, closing said passageway;

said second retainer portion being formed on said shutter rotating member, and pushed on said ring-shaped contact face of said cam ridge when said shutter rotating member is rotated to said closed position of said cassette shutter.

12. A lens-fitted photo film unit, including a photo film housing, a cassette containing chamber and a photo film roll chamber formed in said photo film housing, a cassette being contained in said cassette containing chamber, a photo film of a predetermined length being contained in said photo film roll chamber in a roll form, said cassette having a cassette shell, a spool contained in said cassette shell in a rotatable manner, and a rotatable cassette shutter for opening/closing a photo film passageway in said cassette shell, said cassette shutter, when rotated in an open position, opening said passageway, and when rotated in a closed position, closing said passageway, said photo film being secured to said spool, said lens-fitted photo film unit comprising:

a winder wheel, connected to said spool, operated externally of said photo film housing each time after one frame is exposed on said photo film, to wind an exposed portion of said photo film into said cassette about said spool;

a shutter rotating member, connected to an end of said cassette shutter, for rotating said cassette shutter;

a transmission mechanism, actuated when said winder wheel has made a predetermined number of rotations, for rotating said shutter rotating member to said closed position of said cassette shutter in response to said rotations of said winder wheel, said predetermined number depending upon said predetermined length of said photo film, said transmission mechanism closing said cassette shutter after said photo film has been entirely wound into said cassette shell; and a wheel lock mechanism for locking said winder wheel in a predetermined position in response to rotation of said cassette shutter to said closed position, said wheel lock mechanism inhibiting said winder wheel from being rotated in response to rotation of said spool to a predetermined rotational position after said cassette shutter is closed by use of said transmission mechanism.

13. A lens-fitted photo film unit as defined in claim 12, further comprising:

an intermittent gear, disposed in a manner rotatable integrally with said winder wheel, and having at least one tooth;

a counter gear, meshed with said intermittent gear, and stepped by a regular angle by rotation of said intermittent gear, said counter gear being adapted to counting said frame created on said photo film;

said transmission mechanism including:

an intermediate gear, disposed in a rotatable manner relative to said shutter rotating member about an axis thereof, and rotated by said counter gear;

a cam disk disposed in a manner rotatable integrally with said counter gear;

a guide groove formed in a periphery of said cam disk to extend substantially in parallel with an axial direction thereof;

a connecting projection, disposed to protrude from a periphery of said intermediate gear substantially in parallel with an axial direction thereof, pushed on said cam disk, received in said guide groove upon a finish of said predetermined number of said rotations of said winder wheel, for allowing sliding said intermediate gear in said axial direction; and an engaging cutout, formed in said periphery of said shutter rotating member, engaged with said connecting projection after said connecting projection is received in said guide groove, for transmitting rotation of said intermediate gear to said shutter rotating member.

14. A lens-fitted photo film unit as defined in claim 13, further comprising a spring for biasing said intermediate gear toward said shutter rotating member.

15. A lens-fitted photo film unit as defined in claim 14, wherein an initial relative position where said counter gear is meshed with said intermediate gear is changeable in consideration of a change in said predetermined number of said rotations of said winder wheel in association with a change in said predetermined length of said photo film.

16. A lens-fitted photo film unit as defined in claim 15, wherein said wheel lock mechanism includes:

a swingable lock lever having a first arm portion confronted with said shutter rotating member, and a second arm portion confronted with said intermittent gear;

a spring member for biasing said lock lever in a direction of moving said second arm portion away from said intermittent gear;

a push projection disposed on said shutter rotating member; and a lock projection disposed on said intermittent gear, said lock lever being swung against said bias member when said first arm portion is pushed by said push projection, for engaging said second arm portion with said lock projection, to lock said winder wheel rotationally.

17. A lens-fitted photo film unit as defined in claim 16, further comprising an engaging projection, disposed on said first arm portion, engaged with a tooth of said intermediate gear with bias of said spring member, for preventing said intermediate gear from being rotated incidentally.

18. A lens-fitted photo film unit as defined in claim 12, wherein said cassette shell includes:

an indicator plate disposed in a manner rotatable integrally with said spool; and at least two indicator openings, formed to open in a wall covering said indicator plate, arranged in said rotational direction of said indicator plate, for respectively causing said indicator plate to appear externally and partially, respectively to indicate an unexposed status and an exposed status of said photo film, wherein said indicator indicates said exposed status when said spool is stopped in said predetermined rotational position.

19. A lens-fitted photo film unit, including a photo film housing, a cassette containing chamber and a photo film roll chamber formed in said photo film housing, a cassette being contained in said cassette containing chamber, a photo film of a predetermined length being contained in said photo film roll chamber in a roll form, said cassette having a cassette shell, a spool contained in said cassette shell in a rotatable manner, and a rotatable cassette shutter for opening/closing a photo film passageway in said cassette shell, said cassette shutter, when rotated in an open position, opening said passageway, and when rotated in a closed position, closing said passageway, said photo film being secured to said spool, said lens-fitted photo film unit comprising:

a winder wheel, connected to said spool, operated externally of said photo film housing each time after one frame is exposed on said photo film, to wind an exposed portion of said photo film into said cassette about said spool;

a shutter rotating member, connected to an end of said cassette shutter, for rotating said cassette shutter;

a spring for biasing said shutter rotating member toward said closed position of said cassette shutter;

a timing lever disposed in a swingable manner between first and second positions, and when in said first position, being engaged with said shutter rotating member against said spring for retaining said shutter rotating member in said open position of said cassette shutter, and when in said second position, releasing said shutter rotating member from retention in said open position of said cassette shutter;

an intermittent transmission unit, actuated when said winder wheel has made a predetermined number of rotations, for swinging said timing lever to said second position, said predetermined number being adapted to entirely winding of said photo film into said cassette shell; and a pre-shifter member, disposed in said intermittent transmission unit, for swinging said timing lever in reverse to a direction toward said second position before swinging said timing lever toward said second position, to destroy a stuck state between contacting points of said timing lever and said shutter rotating member with said shutter rotating member retained in said open position of said cassette shutter.

20. A lens-fitted photo film unit as defined in claim 19, further comprising:

an intermittent gear, disposed in a manner rotatable integrally with said winder wheel, and having at least one tooth;

a counter gear, meshed with said intermittent gear, and stepped by a regular angle by rotation of said intermittent gear, said counter gear being adapted to counting said frame created on said photo film;

said timing lever including an engaging protruded end disposed near to said shutter rotating member, and a detecting protruded end protruded substantially opposite to said engaging protruded end;

said intermittent transmission unit including:

a cam disk disposed in a manner rotatable integrally with said counter gear, said detecting protruded end being pushed on said cam disk;

a cutout, formed in a periphery of said cam disk, for receiving said detecting protruded end upon a finish of said predetermined number of said rotations of said winder wheel, for allowing said timing lever to swing;

said pre-shifter member comprising a protruded portion, disposed on said periphery of said cam disk beside said cutout, and protruded radially from said cam disk, confronted with said detecting protruded end before said finish of said predetermined number of said rotations of said winder wheel, for pushing said detecting protruded end to swing said timing lever, to destroy said stuck state of said engaging protruded end and said shutter rotating member.

21. A lens-fitted photo film unit, including a photo film housing, a cassette containing chamber and a photo film roll chamber formed in said photo film housing, a cassette being contained in said cassette containing chamber, a photo film of a predetermined length being contained in said photo film roll chamber in a roll form, said cassette having a cassette shell, a spool contained in said cassette shell in a rotatable manner, and a rotatable cassette shutter for opening/closing a photo film passageway in said cassette shell, said cassette shutter, when rotated in an open position, opening said passageway, and when rotated in a closed position, closing said passageway, said photo film being secured to said spool, said lens-fitted photo film unit comprising:

a winder wheel, connected to said spool, operated externally of said photo film housing each time after one frame is exposed on said photo film, to wind an exposed portion of said photo film into said cassette about said spool;

a shutter rotating member, connected to an end of said cassette shutter, for rotating said cassette shutter;

a spring for biasing said shutter rotating member toward said closed position of said cassette shutter;

a timing lever disposed in a swingable manner between first and second positions, and when in said first position, being engaged with said shutter rotating member against said spring for retaining said shutter rotating member in said open position of said cassette shutter, and when in said second position, releasing said shutter rotating member from retention in said open position of said cassette shutter;

an intermittent transmission unit, actuated when said winder wheel has made a predetermined number of rotations, for swinging said timing lever to said second position, said predetermined number being adapted to entirely winding of said photo film into said cassette shell; and wherein said timing lever is formed of material different from material of which said shutter rotating member is formed, so as to prevent between contacting points of said timing lever and said shutter rotating member from being fixed on one another.

22. A lens-fitted photo film unit, including a photo film housing, a cassette containing chamber and a photo film roll chamber formed in said photo film housing, a cassette being contained in said cassette containing chamber, a photo film of a predetermined length being contained in said photo film roll chamber in a roll form, said cassette having a cassette shell, a spool contained in said cassette shell in a rotatable manner, and a rotatable cassette shutter for opening and closing a photo film passageway in said cassette shell, said cassette shutter, when rotated in an open position, opening said passageway, and when rotated in a closed position, closing said passageway, said photo film being secured to said spool, said lens-fitted photo film unit comprising:

a winder wheel, connected to said spool, adapted to be operated externally of said photo film housing after each exposure of said photo film, to wind an exposed portion of said photo film into said cassette about said spool;

a shutter rotating member, connected to an end of said cassette-shutter, for rotating said cassette shutter; and a transmission mechanism, actuated when said winder wheel has made a predetermined number of rotations, for rotating said shutter rotating member to said closed position of said cassette shutter in response to said rotations of said winder wheel, said predetermined number depending upon said predetermined length of said photo film, said transmission mechanism closing said cassette shutter after said photo film has been entirely wound into said cassette shell.

* * * * *